United States Patent
Kulshreshtha et al.

(10) Patent No.: US 10,708,152 B2
(45) Date of Patent: Jul. 7, 2020

(54) PREDICTING APPLICATION AND NETWORK PERFORMANCE

(71) Applicant: CISCO TECHNOLOGY, INC., San Jose, CA (US)

(72) Inventors: Ashutosh Kulshreshtha, San Jose, CA (US); Navindra Yadav, Cupertino, CA (US); Khawar Deen, Sunnyvale, CA (US); Jackson Pang, Sunnyvale, CA (US); Supreeth Rao, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 283 days.

(21) Appl. No.: 15/467,788

(22) Filed: Mar. 23, 2017

(65) Prior Publication Data

US 2018/0278496 A1    Sep. 27, 2018

(51) Int. Cl.
*H04L 12/26* (2006.01)
*H04L 29/08* (2006.01)
*H04L 12/24* (2006.01)

(52) U.S. Cl.
CPC ............ *H04L 43/04* (2013.01); *H04L 41/145* (2013.01); *H04L 43/0852* (2013.01); *H04L 41/083* (2013.01); *H04L 41/147* (2013.01)

(58) Field of Classification Search
CPC ......... H04L 43/04; H04L 43/08; G06F 15/16; G06F 19/00; G06F 11/3034
(Continued)

(56) References Cited

U.S. PATENT DOCUMENTS

| 5,086,385 A | 2/1992 | Launey et al. |
| 5,319,754 A | 6/1994 | Meinecke et al. |

(Continued)

FOREIGN PATENT DOCUMENTS

| CN | 101093452 | 12/2007 |
| CN | 101770551 | 7/2010 |

(Continued)

OTHER PUBLICATIONS

Bosch, Greg, "Virtualization," 2010, 33 pages.
(Continued)

*Primary Examiner* — Tesfay Yohannes
(74) *Attorney, Agent, or Firm* — Polsinelli PC

(57) ABSTRACT

An application and network analytics platform can capture comprehensive telemetry from servers and network devices operating within a network. The platform can discover flows running through the network, applications generating the flows, servers hosting the applications, computing resources provisioned and consumed by the applications, and network topology, among other insights. The platform can generate various models relating one set of application and network performance metrics to another. For example, the platform can model application latency as a function of computing resources provisioned to and/or actually used by the application, its host's total resources, and/or the distance of its host relative to other elements of the network. The platform can change the model by moving, removing, or adding elements to predict how the change affects application and network performance. In some situations, the platform can automatically act on predictions to improve application and network performance.

17 Claims, 7 Drawing Sheets

(58) Field of Classification Search
USPC .................................... 709/224; 370/351
See application file for complete search history.

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,822,731 A | 10/1998 | Schultz |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,546,420 B1 | 4/2003 | Lemler et al. |
| 6,597,663 B1 | 7/2003 | Rekhter |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | Melampy et al. |
| 7,162,643 B1 | 1/2007 | Sankaran et al. |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,337,206 B1 | 2/2008 | Wen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |

(56) References Cited

U.S. PATENT DOCUMENTS

| | | |
|---|---|---|
| 8,775,577 B1 | 7/2014 | Alford et al. |
| 8,776,180 B2 | 7/2014 | Kumar et al. |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 6/2016 | Shimomura et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 10,284,928 B2* | 5/2019 | Teflian .................. H04Q 9/02 |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0043716 A1* | 2/2008 | Toombs .................. H04L 45/00<br>370/351 |

(56) References Cited

U.S. PATENT DOCUMENTS

| | | |
|---|---|---|
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2008/0304715 A1* | 12/2008 | Ishida ............... G06K 9/00288 382/118 |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | Dehaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | Dehaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246123 A1* | 10/2011 | DelloStritto ............. A61B 5/11 702/141 |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0147890 A1* | 6/2012 | Kikuchi ............... H04L 12/4633 370/392 |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |

(56) References Cited

U.S. PATENT DOCUMENTS

| | | |
|---|---|---|
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0269777 A1 | 9/2014 | Rothstein et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0012339 A1* | 1/2015 | Onischuk ............ G07C 13/00 705/12 |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0265150 A1* | 9/2015 | Darty ............... A61B 5/0013 600/477 |
| 2015/0271008 A1 | 9/2015 | Jain et al. |
| 2015/0271255 A1 | 9/2015 | MacKay et al. |
| 2015/0295945 A1 | 10/2015 | Canzanese, Jr. et al. |
| 2015/0312233 A1 | 10/2015 | Graham, III et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0287189 A1* | 10/2016 | Modai ............... A61B 5/747 |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |

(56) References Cited

U.S. PATENT DOCUMENTS

| | | |
|---|---|---|
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubai et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0048850 A1* | 2/2018 | Bostick .................. H04N 7/188 |
| 2018/0145906 A1 | 5/2018 | Yadav et al. |
| 2018/0193672 A1* | 7/2018 | Hirai .................... G06K 9/6228 |
| 2018/0278496 A1* | 9/2018 | Kulshreshtha .......... H04L 43/04 |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.
Arista Networks, Inc., "Application Visibility and Network Telemtry using Splunk," Arista White Paper, Nov. 2013, 11 pages.
Bauch, Petr, "Reader's Report of Master's Thesis, Analysis and Testing of Distributed NoSQL Datastore Riak," May 28, 2015, Brno. 2 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Duan, Yiheng, et al., Detective: Automatically Identify and Analyze Malware Processes in Forensic Scenarios via DLLs, IEEE ICC 2015—Next Generation Networking Symposium, pp. 5691-5696.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection," IEEE, 2004, pp. 599-612.
Thomas, R., "Bogon Dotted Decimal List," Version 7.0, Team Cymru NOC, Apr. 27, 2012, 5 pages.
Baek, Kwang-Hyun, et al., "Preventing Theft of Quality of Service on Open Platforms," 2005 Workshop of the 1st International Conference on Security and Privacy for Emerging Areas in Communication Networks, 2005, 12 pages.
Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.
Zeng, Sai, et al., "Managing Risk in Multi-node Automation of Endpoint Management," 2014 IEEE Network Operations and Management Symposium (NOMS), 2014, 6 pages.
Australian Government Department of Defence, Intelligence and Security, "Top 4 Strategies to Mitigate Targeted Cyber Intrusions," Cyber Security Operations Centre July 2013, http://www.asd.gov.au/infosec/top-mitigations/top-4-strategies-explained.htm.
Author Unknown, "Blacklists & Dynamic Reputation: Understanding Why the Evolving Threat Eludes Blacklists," www.dambaia.com, 9 pages, Dambala, Atlanta, GA, USA.
Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.
Backes, Michael, et al., "Data Lineage in Malicious Environments," IEEE 2015, pp. 1-13.
Bayati, Mohsen, et al., "Message-Passing Algorithms for Sparse Network Alignment," Mar. 2013, 31 pages.

(56) References Cited

OTHER PUBLICATIONS

Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, filed Jan. 21, 2015, entitled "Monitoring Network Policy Compliance."
Chandran, Midhun, et al., "Monitoring in a Virtualized Environment," GSTF International Journal on Computing, vol. 1, No. 1, Aug. 2010.
Chari, Suresh, et al., "Ensuring continuous compliance through reconciling policy with usage," Proceedings of the $18^{th}$ ACM symposium on Access control models and technologies (SACMAT'13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Cisco Systems, "Cisco Network Analysis Modules (NAM) Tutorial," Cisco Systems, Inc., Version 3.5.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
InternetPerils, Inc., "Control Your Internet Business Risk," 2003-2015, https://www.internetperils.com.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.

(56) References Cited

OTHER PUBLICATIONS

Wang, Yongjun, et al., "A Network Gene-Based Framework for Detecting Advanced Persistent Threats," Nov. 2014, 7 pages.

Woodberg, Brad, "Snippet from Juniper SRX Series" Jun. 17, 2013, 1 page, O'Reilly Media, Inc.

Zhang, Yue, et al., "CANTINA: A Content-Based Approach to Detecting Phishing Web Sites," May 8-12, 2007, pp. 639-648.

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.

Brocade Communications Systems, Inc., "Chapter 5—Configuring Virtual LANs (VLANs)," Jun. 2009, 38 pages.

Cisco Systems, Inc. "Cisco, Nexus 3000 Series NX-OS Release Notes, Release 5.0(3)U3(1)," Feb. 29, 2012, Part No. OL-26631-01, 16 pages.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007, 66 pages.

Cisco Systems, Inc., "Cisco Data Center Network Architecture and Solutions Overview," Feb. 2006, 19 pages.

Cisco Systems, Inc., "Cisco IOS Configuration Fundamentals Configuration Guide: *Using Autoinstall and Setup*," Release 12.2, first published Apr. 2001, last updated Sep. 2003, 32 pages.

Cisco Systems, Inc., "Cisco VN-Link: Virtualization-Aware Networking," White Paper, Mar. 2009, 10 pages.

Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.

Cisco Systems, Inc., "Quick Start Guide, Cisco ACE 4700 Series Application Control Engine Appliance," Software Ve740rsion A5(1.0), Sep. 2011, 138 pages.

Cisco Systems, Inc., "Routing and Bridging Guide, Cisco ACE Application Control Engine," Software Version A5(1.0), Sep. 2011, 248 pages.

Cisco Systems, Inc., "VMWare and Cisco Virtualization Solution: Scale Virtual Machine Networking," Jul. 2009, 4 pages.

Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.

Cisco Technology, Inc., "Cisco IOS Software Release 12.4T Features and Hardware Support," Feb. 2009, 174 pages.

Cisco Systems, Inc., "Cisco Application Control Engine (ACE) Troubleshooting Guide—Understanding the ACE Module Architecture and Traffic Flow," Mar. 11, 2011, 6 pages.

Costa, Raul, et al., "An Intelligent Alarm Management System for Large-Scale Telecommunication Companies," In Portuguese Conference on Artificial Intelligence, Oct. 2009, 14 pages.

De Carvalho, Tiago Filipe Rodrigues, "Root Cause Analysis in Large and Complex Networks," Dec. 2008, Repositorio.ul.pt, pp. 1-55

Foundation for Intelligent Physical Agents, "FIPA Agent Message Transport Service Specification," Dec. 3, 2002, http://www.fipa.org; 15 pages.

Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.

Joseph, Dilip, et al., "Modeling Middleboxes," IEEE Network, Sep./Oct. 2008, pp. 20-25.

Kent, S., et al. "Security Architecture for the Internet Protocol," Network Working Group, Nov. 1998, 67 pages.

Online Collins English Dictionary, 1 page (Year: 2018).

Voris, Jonathan, et al., "Bait and Snitch: Defending Computer Systems with Decoys," Columbia University Libraries, Department of Computer Science, 2013, pp. 1-25.

\* cited by examiner

PREDICTING APPLICATION AND NETWORK PERFORMANCE

TECHNICAL FIELD

The subject matter of this disclosure relates in general to the field of computer networks, and more specifically for predicting application and network performance.

BACKGROUND

Modern day data centers can present many challenges to administrators. A typical enterprise network routinely processes millions or billions of flows each day and about 10,000 active flows per rack each second. Administrators must also contend with the ever-expanding attack surface of their networks. In addition, enterprises are seeing workloads that exhibit different behavior from traditional applications and services. For example, the adoption of micro-services has resulted in containerized applications with lifecycles that may last no longer than milliseconds, making their operations difficult to capture. Virtualization and integration of private networks with public networks (i.e., implementing a hybrid cloud) also add to the complexity of assessing the state of the data center. Moreover, the increasing use of massively distributed systems can also make it difficult to evaluate application and network performance.

DESCRIPTION OF EXAMPLE EMBODIMENTS

Overview

An application and network analytics platform can capture telemetry (e.g., flow data, server data, process data, user data, policy data, etc.) from servers (e.g., physical and/or virtual servers) (sometimes also referred to as hosts, endpoints, computing devices, machines, and the like) and network devices (e.g., switches, routers, hubs, etc.) operating within a data center. The application and network analytics platform can discover the flows running through the network, the applications generating the flows, the servers hosting the applications, the resources (e.g., CPU, memory, storage, networking, etc.) provisioned and consumed by the applications, and the topology of the network, among other insights. The application and network analytics platform can generate various models relating one set of application and network performance metrics to another. In an embodiment, the application and network analytics platform can model application latency as a function of the computing resources provisioned to and/or actually used by the application, its host's total resources, and/or the distance of its host relative to other elements of the network. The application and network analytics platform can update a model by moving, removing, or adding elements to predict how the update affects application and network performance. In some embodiments, the application and network analytics platform can automatically act on predictions to improve unavailability, load, latency, and other application and network performance issues.

DESCRIPTION

Figure 1:
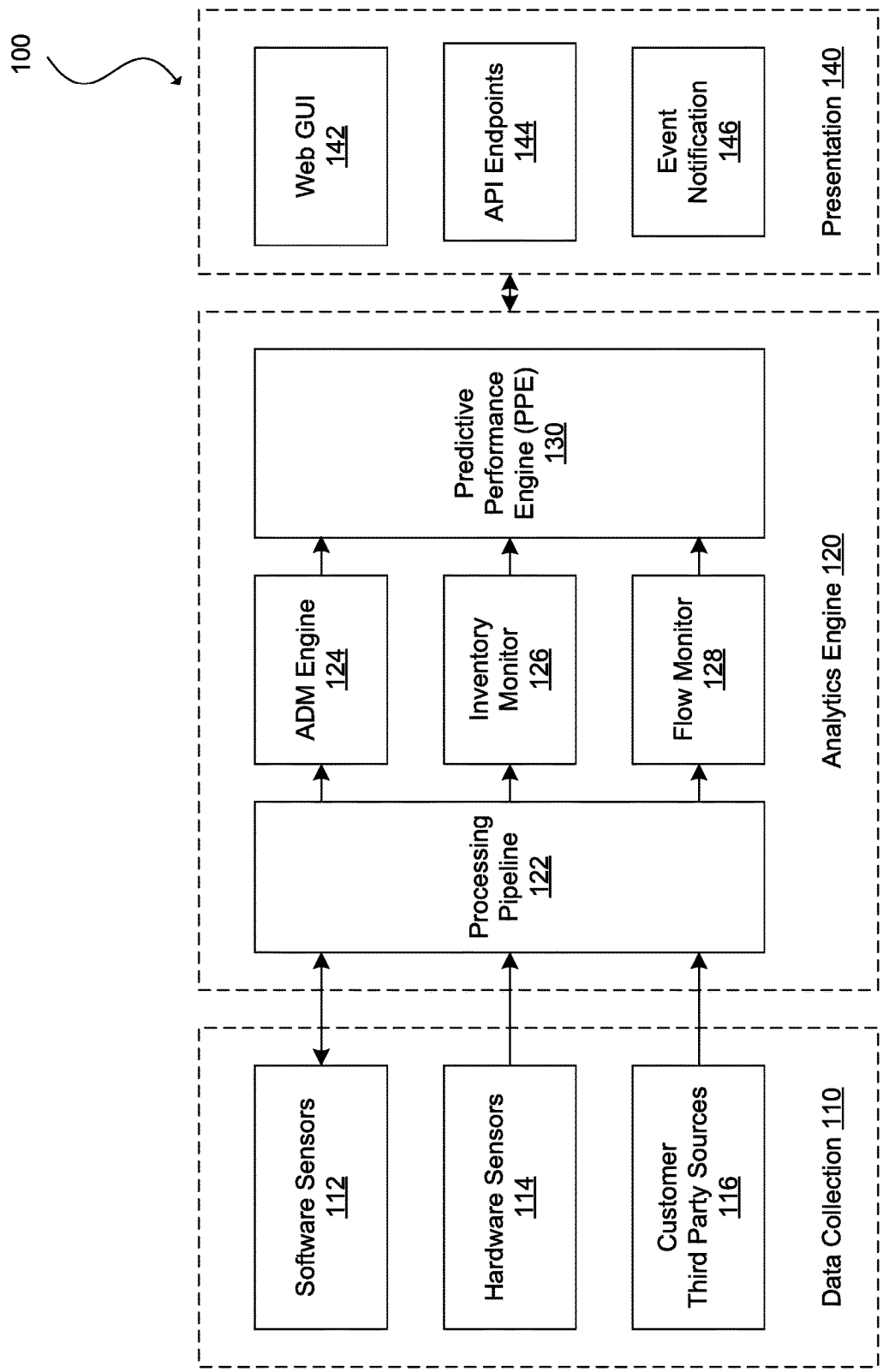
FIG. 1 illustrates an example of an application and network analytics platform for predicting application and network performance in accordance with an embodiment.

FIG. 1 illustrates an example of an application and network analytics platform 100 in accordance with an embodiment. Tetration Analytics™ provided by Cisco Systems®, Inc. of San Jose Calif. is an example implementation of the application and network analytics platform 100. However, one skilled in the art will understand that FIG. 1 (and generally any system discussed in this disclosure) is but one possible embodiment of an application and network analytics platform and that other embodiments can include additional, fewer, or alternative components arranged in similar or alternative orders, or in parallel, unless otherwise stated.

In the example of FIG. 1, the application and network analytics platform 100 includes a data collection layer 110, an analytics engine 120, and a presentation layer 140. The data collection layer 110 may include software sensors 112, hardware sensors 114, and customer/third party data sources 116. The software sensors 112 can run within servers of a network, such as physical or bare-metal servers; hypervisors, virtual machine monitors, container orchestrators, or other virtual entity managers; virtual machines, containers, or other virtual entities. The hardware sensors 114 can reside on the application-specific integrated circuits (ASICs) of switches, routers, or other network devices (e.g., packet capture (pcap) appliances such as a standalone packet monitor, a device connected to a network device's monitoring port, a device connected in series along a main trunk of a data center, or similar device). The software sensors 112 can capture telemetry (e.g., flow data, server data, process data, user data, policy data, etc.) from the servers and the hardware sensors 114 can capture network telemetry (e.g., flow data) from network devices, and send the telemetry to the analytics engine 120 for further processing. For example, the software sensors 112 can sniff packets sent over their hosts' physical or virtual network interface cards (NICs), or individual processes on each server can report the telemetry to the software sensors 112. The hardware sensors 114 can capture network telemetry at line rate from all ports of the network devices hosting the hardware sensors.

Figure 2:
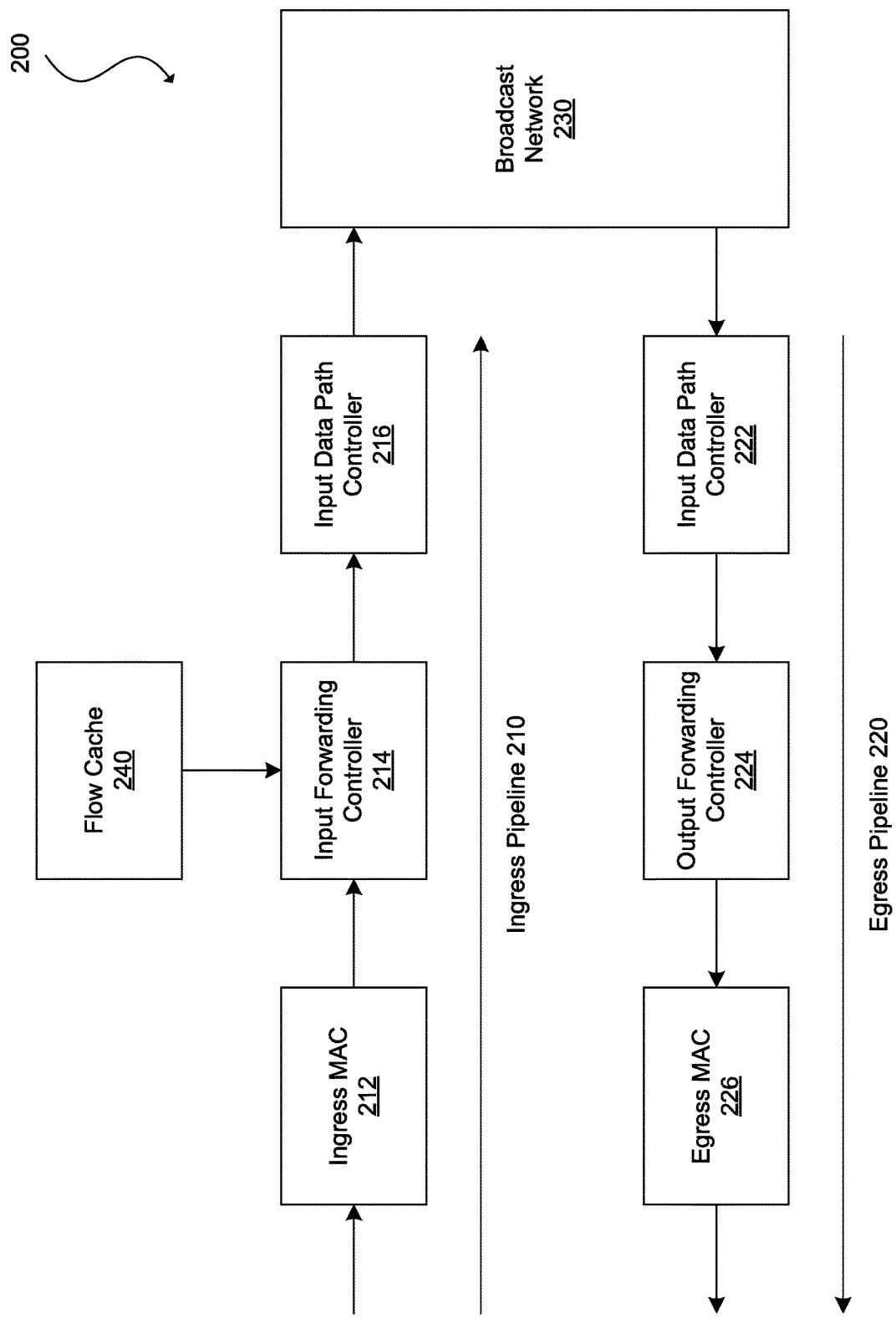
FIG. 2 illustrates an example of a forwarding pipeline of an application-specific integrated circuit (ASIC) of a network device in accordance with an embodiment.

FIG. 2 illustrates an example of a unicast forwarding pipeline 200 of an ASIC for a network device that can capture network telemetry at line rate with minimal impact on the CPU. In some embodiments, one or more network devices may incorporate the Cisco® ASE2 or ASE3 ASICs for implementing the forwarding pipeline 200. For example, certain embodiments include one or more Cisco Nexus® 9000 Series Switches provided by Cisco Systems® that utilize the ASE2 or ASE3 ASICs or equivalent ASICs. The ASICs may have multiple slices (e.g., the ASE2 and ASE3 have six slices and two slices, respectively) in which each slice represents a switching subsystem with both an ingress forwarding pipeline 210 and an egress forwarding pipeline 220. The ingress forwarding pipeline 210 can include an input/output (I/O) component, ingress MAC 212; an input forwarding controller 214; and an input data path controller 216. The egress forwarding pipeline 220 can include an output data path controller 222, an output forwarding controller 224, and an I/O component, egress MAC 226. The slices may connect to a broadcast network 230 that can provide point-to-multipoint connections from each slice and all-to-all connectivity between slices. The broadcast network 230 can provide enough bandwidth to support full-line-rate forwarding between all slices concurrently. When a packet enters a network device, the packet goes through the ingress forwarding pipeline 210 of the slice on which the port of the ingress MAC 212 resides, traverses the broadcast network 230 to get onto the egress slice, and then goes through the egress forwarding pipeline 220 of the egress slice. The input forwarding controller 214 can receive the packet from the port of the ingress MAC 212, parse the packet headers, and perform a series of lookups to determine whether to forward the packet and how to forward the packet to its intended destination. The input forwarding controller 214 can also generate instructions for the input data path controller 216 to store and queue the packet. In some embodiments, the network device may be a cut-through switch such that the network device performs input forwarding while storing the packet in a pause buffer block (not shown) of the input data path controller 216.

As discussed, the input forwarding controller 214 may perform several operations on an incoming packet, including parsing the packet header, performing an L2 lookup, performing an L3 lookup, processing an ingress access control list (ACL), classifying ingress traffic, and aggregating forwarding results. Although describing the tasks performed by the input forwarding controller 214 in this sequence, one of ordinary skill will understand that, for any process discussed herein, there can be additional, fewer, or alternative steps performed in similar or alternative orders, or in parallel, within the scope of the various embodiments unless otherwise stated.

In some embodiments, when a unicast packet enters through a front-panel port (e.g., a port of ingress MAC 212), the input forwarding controller 214 may first perform packet header parsing. For example, the input forwarding controller 214 may parse the first 128 bytes of the packet to extract and save information such as the L2 header, EtherType, L3 header, and TCP IP protocols.

As the packet goes through the ingress forwarding pipeline 210, the packet may be subject to L2 switching and L3 routing lookups. The input forwarding controller 214 may first examine the destination MAC address of the packet to determine whether to switch the packet (i.e., L2 lookup) or route the packet (i.e., L3 lookup). For example, if the destination MAC address matches the network device's own MAC address, the input forwarding controller 214 can perform an L3 routing lookup. If the destination MAC address does not match the network device's MAC address, the input forwarding controller 214 may perform an L2 switching lookup based on the destination MAC address to determine a virtual LAN (VLAN) identifier. If the input forwarding controller 214 finds a match in the MAC address table, the input forwarding controller 214 can send the packet to the egress port. If there is no match for the destination MAC address and VLAN identifier, the input forwarding controller 214 can forward the packet to all ports in the same VLAN.

During L3 routing lookup, the input forwarding controller 214 can use the destination IP address for searches in an L3 host table. This table can store forwarding entries for directly attached hosts and learned/32 host routes. If the destination IP address matches an entry in the host table, the entry will provide the destination port, next-hop MAC address, and egress VLAN. If the input forwarding controller 214 finds no match for the destination IP address in the host table, the input forwarding controller 214 can perform a longest-prefix match (LPM) lookup in an LPM routing table.

In addition to forwarding lookup, the input forwarding controller 214 may also perform ingress ACL processing on the packet. For example, the input forwarding controller 214 may check ACL ternary content-addressable memory (TCAM) for ingress ACL matches. In some embodiments, each ASIC may have an ingress ACL TCAM table of 4000 entries per slice to support system internal ACLs and user-defined ingress ACLs. These ACLs can include port ACLs, routed ACLs, and VLAN ACLs, among others. In some embodiments, the input forwarding controller 214 may localize the ACL entries per slice and program them only where needed.

In some embodiments, the input forwarding controller 214 may also support ingress traffic classification. For example, from an ingress interface, the input forwarding controller 214 may classify traffic based on the address field, IEEE 802.1q class of service (CoS), and IP precedence or differentiated services code point in the packet header. In some embodiments, the input forwarding controller 214 can assign traffic to one of eight quality-of-service (QoS) groups. The QoS groups may internally identify the traffic classes used for subsequent QoS processes as packets traverse the system.

In some embodiments, the input forwarding controller 214 may collect the forwarding metadata generated earlier in the pipeline (e.g., during packet header parsing, L2 lookup, L3 lookup, ingress ACL processing, ingress traffic classification, forwarding results generation, etc.) and pass it downstream through the input data path controller 216. For example, the input forwarding controller 214 can store a 64-byte internal header along with the packet in the packet buffer. This internal header can include 16 bytes of iETH (internal communication protocol) header information, which the input forwarding controller 214 can prepend to the packet when transferring the packet to the output data path controller 222 through the broadcast network 230. The network device can strip the 16-byte iETH header when the packet exits the front-panel port of the egress MAC 226. The network device may use the remaining internal header space (e.g., 48 bytes) to pass metadata from the input forwarding queue to the output forwarding queue for consumption by the output forwarding engine.

In some embodiments, the input data path controller 216 can perform ingress accounting functions, admission functions, and flow control for a no-drop class of service. The ingress admission control mechanism can determine whether to admit the packet into memory based on the amount of buffer memory available and the amount of buffer space already used by the ingress port and traffic class. The input data path controller 216 can forward the packet to the output data path controller 222 through the broadcast network 230.

As discussed, in some embodiments, the broadcast network 230 can comprise a set of point-to-multipoint wires that provide connectivity between all slices of the ASIC. The input data path controller 216 may have a point-to-multipoint connection to the output data path controller 222 on all slices of the network device, including its own slice.

In some embodiments, the output data path controller 222 can perform egress buffer accounting, packet queuing, scheduling, and multicast replication. In some embodiments, all ports can dynamically share the egress buffer resource. In some embodiments, the output data path controller 222 can also perform packet shaping. In some embodiments, the network device can implement a simple egress queuing architecture. For example, in the event of egress port congestion, the output data path controller 222 can directly queue packets in the buffer of the egress slice. In some embodiments, there may be no virtual output queues (VoQs) on the ingress slice. This approach can simplify system buffer management and queuing.

As discussed, in some embodiments, one or more network devices can support up to 10 traffic classes on egress, 8 user-defined classes identified by QoS group identifiers, a CPU control traffic class, and a switched port analyzer (SPAN) traffic class. Each user-defined class can have a unicast queue and a multicast queue per egress port. This approach can help ensure that no single port will consume more than its fair share of the buffer memory and cause buffer starvation for other ports.

In some embodiments, multicast packets may go through similar ingress and egress forwarding pipelines as the unicast packets but instead use multicast tables for multicast forwarding. In addition, multicast packets may go through a multistage replication process for forwarding to multiple destination ports. In some embodiments, the ASIC can include multiple slices interconnected by a non-blocking internal broadcast network. When a multicast packet arrives at a front-panel port, the ASIC can perform a forwarding lookup. This lookup can resolve local receiving ports on the same slice as the ingress port and provide a list of intended receiving slices that have receiving ports in the destination multicast group. The forwarding engine may replicate the packet on the local ports, and send one copy of the packet to the internal broadcast network, with the bit vector in the internal header set to indicate the intended receiving slices. In this manner, only the intended receiving slices may accept the packet off of the wire of the broadcast network. The slices without receiving ports for this group can discard the packet. The receiving slice can then perform local L3 replication or L2 fan-out lookup and replication to forward a copy of the packet to each of its local receiving ports.

In FIG. 2, the forwarding pipeline 200 also includes a flow cache 240, which when combined with direct export of collected telemetry from the ASIC (i.e., data hardware streaming), can enable collection of packet and flow metadata at line rate while avoiding CPU bottleneck or overhead. The flow cache 240 can provide a full view of packets and flows sent and received by the network device. The flow cache 240 can collect information on a per-packet basis, without sampling and without increasing latency or degrading performance of the network device. To accomplish this, the flow cache 240 can pull information from the forwarding pipeline 200 without being in the traffic path (i.e., the ingress forwarding pipeline 210 and the egress forwarding pipeline 220).

In addition to the traditional forwarding information, the flow cache 240 can also collect other metadata such as detailed IP and TCP flags and tunnel endpoint identifiers. In some embodiments, the flow cache 240 can also detect anomalies in the packet flow such as inconsistent TCP flags. The flow cache 240 may also track flow performance information such as the burst and latency of a flow. By providing this level of information, the flow cache 240 can produce a better view of the health of a flow. Moreover, because the flow cache 240 does not perform sampling, the flow cache 240 can provide complete visibility into the flow.

In some embodiments, the flow cache 240 can include an events mechanism to complement anomaly detection. This configurable mechanism can define a set of parameters that represent a packet of interest. When a packet matches these parameters, the events mechanism can trigger an event on the metadata that triggered the event (and not just the accumulated flow information). This capability can give the flow cache 240 insight into the accumulated flow information as well as visibility into particular events of interest. In this manner, networks, such as a network implementing the application and network analytics platform 100, can capture telemetry more comprehensively and not impact application and network performance.

Returning to FIG. 1, the telemetry captured by the software sensors 112 and hardware sensors 114 can include metadata relating to individual packets (e.g., packet size, source address, source port, destination address, destination port, etc.); flows (e.g., number of packets and aggregate size of packets having the same source address/port, destination address/port, L3 protocol type, class of service, router/switch interface, etc. sent/received without inactivity for a certain time (e.g., 15 seconds) or sent/received over a certain duration (e.g., 30 minutes)); flowlets (e.g., flows of sub-requests and sub-responses generated as part of an original request or response flow and sub-flows of these flows); bidirectional flows (e.g., flow data for a request/response pair of flows having corresponding source address/port, destination address/port, etc.); groups of flows (e.g., flow data for flows associated with a certain process or application, server, user, etc.), sessions (e.g., flow data for a TCP session); or other types of network communications of specified granularity. That is, the network telemetry can generally include any information describing communication on all layers of the Open Systems Interconnection (OSI) model. In some embodiments, the network telemetry collected by the sensors 112 and 114 can also include other network traffic data such as hop latency, packet drop count, port utilization, buffer information (e.g., instantaneous queue length, average queue length, congestion status, etc.), and other network statistics.

In some embodiments, the application and network analytics platform 100 can resolve flows into flowlets (i.e., sequences of requests and responses of a larger request and response) of various granularities. For example, a response to a request to an enterprise application may result in multiple sub-requests and sub-responses to various back-end services (e.g., authentication, static content, data, search, sync, etc.). The application and network analytics platform 100 can break a flow into its constituent components to provide greater insight into application and network performance. The application and network analytics platform 100 can perform this resolution in real time or substantially real time (e.g., no more than a few minutes after detecting the flow).

The application and network analytics platform 100 can associate a flow with a server sending or receiving the flow, an application or process triggering the flow, the owner of the application or process, and one or more policies applicable to the flow, among other telemetry. The telemetry captured by the software sensors 112 can thus include server data, process data, user data, policy data, and other data (e.g., virtualization information, tenant information, sensor information, etc.). The server telemetry can include the server name, network address, CPU usage, network usage, disk space, ports, logged users, scheduled jobs, open files, and similar information. In some embodiments, the server telemetry can also include information about the file system of the server, such as the lists of files (e.g., log files, configuration files, device special files, etc.) and/or directories stored within the file system as well as the metadata for the files and directories (e.g., presence, absence, or modifications of a file and/or directory). In some embodiments, the server telemetry can further include physical or virtual configuration information (e.g., processor type, amount of random access memory (RAM), amount of disk or storage, type of storage, system type (e.g., 32-bit or 64-bit), operating system, public cloud provider, virtualization platform, etc.).

The process telemetry can include the process name (e.g., bash, httpd, netstat, etc.), process identifier, parent process identifier, path to the process (e.g., /usr2/username/bin/, /usr/local/bin, /usr/bin, etc.), CPU utilization, memory utilization, memory address, scheduling information, nice value, flags, priority, status, start time, terminal type, CPU time taken by the process, and the command string that initiated the process (e.g., "/opt/tetration/collectorket-collector --config_file/etc/tetration/collector/collector.config --timestamp_ flow_info --logtostderr --utc_time_in_file_name true --max_num_ssl_sw_sensors 63000 --enable_client_certificate true"). The user telemetry can include information regarding a process owner, such as the user name, user identifier, user's real name, e-mail address, user's groups, terminal information, login time, expiration date of login, idle time, and information regarding files and/or directories of the user.

The customer/third party data sources 116 can include out-of-band data such as power level, temperature, and physical location (e.g., room, row, rack, cage door position, etc.). The customer/third party data sources 116 can also include third party data regarding a server such as whether the server is on an IP watch list or security report (e.g., provided by Cisco®, Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, and Whois data, and other data from external sources.

In some embodiments, the customer/third party data sources 116 can include data from a configuration management database (CMDB) or configuration management system (CMS) as a service. The CMDB/CMS may transmit configuration data in a suitable format (e.g., JavaScript® object notation (JSON), extensible mark-up language (XML), yet another mark-up language (YAML), etc.)).

The processing pipeline 122 of the analytics engine 120 can collect and process the telemetry. In some embodiments, the processing pipeline 122 can retrieve telemetry from the software sensors 112 and the hardware sensors 114 every 100 ms or faster. Thus, the application and network analytics platform 100 may not miss or is much less likely than conventional systems (which typically collect telemetry every 60 seconds) to miss "mouse" flows. In addition, as the telemetry tables flush so often, the software sensors 112 and the hardware sensors 114 do not or are much less likely than conventional systems to drop telemetry because of overflow/lack of memory. An additional advantage of this approach is that the application and network analytics platform is responsible for flow-state tracking instead of network devices. Thus, the ASICs of the network devices of various embodiments can be simpler or can incorporate other features.

In some embodiments, the processing pipeline 122 can filter out extraneous or duplicative data or it can create summaries of the telemetry. In some embodiments, the processing pipeline 122 may process (and/or the software sensors 112 and hardware sensors 114 may capture) only certain types of telemetry and disregard the rest. For example, the processing pipeline 122 may process (and/or the sensors may monitor) only high-priority telemetry, telemetry associated with a particular subnet (e.g., finance department, human resources department, etc.), telemetry associated with a particular application (e.g., business-critical applications, compliance software, health care applications, etc.), telemetry from external-facing servers, etc. As another example, the processing pipeline 122 may process (and/or the sensors may capture) only a representative sample of telemetry (e.g., every 1,000th packet or other suitable sample rate).

Collecting and/or processing telemetry from multiple servers of the network (including within multiple partitions of virtualized hosts) and from multiple network devices operating between the servers can provide a comprehensive view of network behavior. The capture and/or processing of telemetry from multiple perspectives rather than just at a single device located in the data path (or in communication with a component in the data path) can allow the data to be correlated from the various data sources, which may be used as additional data points by the analytics engine 120. In addition, the granularity of the telemetry can help to create data-rich models for predicting application and network performance as discussed in detail further below.

In addition, collecting and/or processing telemetry from multiple points of view can enable capture of more accurate data. For example, a conventional network may consist of external-facing network devices (e.g., routers, switches, network appliances, etc.) such that the conventional network may not be capable of monitoring east-west traffic, including telemetry for VM-to-VM or container-to-container communications on a same host. As another example, the conventional network may drop some packets before those packets traverse a network device incorporating a sensor. The processing pipeline 122 can substantially mitigate or eliminate these issues altogether by capturing and processing telemetry from multiple points of potential failure. Moreover, the processing pipeline 122 can verify multiple instances of data for a flow (e.g., telemetry from a source (physical server, hypervisor, container orchestrator, other virtual entity manager, VM, container, etc.), one or more network devices, and a destination) against one another.

In some embodiments, the processing pipeline 122 can assess a degree of accuracy of telemetry for a single flow captured by multiple sensors and utilize the telemetry from a single sensor determined to be the most accurate and/or complete. The degree of accuracy can be based on factors such as network topology (e.g., a sensor closer to the source may be more likely to be more accurate than a sensor closer to the destination), a state of a sensor or a server hosting the sensor (e.g., a compromised sensor/server may have less accurate telemetry than an uncompromised sensor/server), or telemetry volume (e.g., a sensor capturing a greater amount of telemetry may be more accurate than a sensor capturing a smaller amount of telemetry).

In some embodiments, the processing pipeline 122 can assemble the most accurate telemetry from multiple sensors. For instance, a first sensor along a data path may capture data for a first packet of a flow but may be missing data for a second packet of the flow while the reverse situation may occur for a second sensor along the data path. The processing pipeline 122 can assemble data for the flow from the first packet captured by the first sensor and the second packet captured by the second sensor.

In some embodiments, the processing pipeline 122 can also disassemble or decompose a flow into sequences of request and response flowlets (e.g., sequences of requests and responses of a larger request or response) of various granularities. For example, a response to a request to an enterprise application may result in multiple sub-requests and sub-responses to various back-end services (e.g., authentication, static content, data, search, sync, etc.). The processing pipeline 122 can break a flow down into its constituent components to provide greater insight into application and network performance. The processing pipeline 122 can perform this resolution in real time or substantially real time (e.g., no more than a few minutes after detecting the flow).

Figure 3:
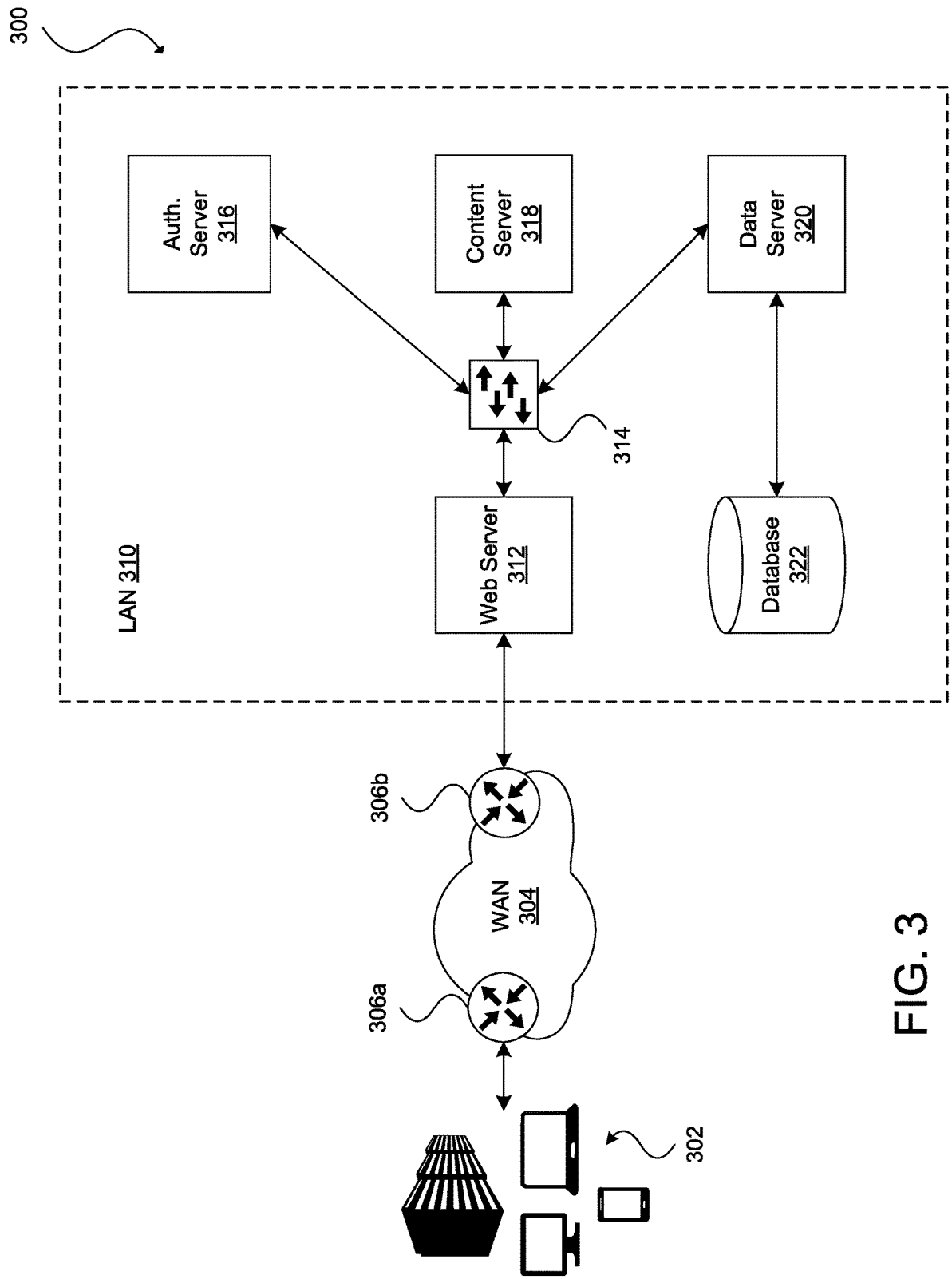
FIG. 3 illustrates an example of a request and response sequence in accordance with an embodiment.

FIG. 3 illustrates an example of a network environment 300. One of ordinary skill will appreciate that, for the network environment 300 and any environment discussed in this disclosure, there can be additional or fewer nodes, devices, links, networks, or components in similar or alternative configurations. Other embodiments may have different numbers and/or types of clients, networks, nodes, cloud components, servers, software components, devices, virtual or physical resources, configurations, topologies, services, appliances, deployments, or network devices. Further, the network environment 300 can include any number or type of resources accessible and utilized by clients or tenants.

The network environment 300 can include a client computing device 302, a wide area network (WAN) 304, and a local area network (LAN) 310. Although not shown here for purposes of simplicity and conciseness, a typical data center may also include a firewall, a load balancer, and/or an additional edge router between an edge network device 306*b* and the web server 312. The client 302 can be any kind of computing device (i.e., of varying types, capabilities, operating systems, etc.) capable of communication over a network, such as a server (physical or virtual), a desktop computer, a laptop, a tablet, a smartphone, or a wearable device (e.g., a watch; eyeglasses, a visor, a head-mounted display or other device generally worn over a user's eyes; headphones, ear buds, or other device generally worn in or over a user's ears; etc.). The client 302 can also be an "infotainment system" (i.e., a computing device integrated with a means of transportation), a "smart" home device or Internet of Things (IoT) device (e.g., a television, a set-top box, a digital video recorder (DVR), a digital video disc (DVD) player or other media player, a video game console, etc.), or other electronic devices.

The WAN 304 can include one or more networks and/or network devices, such as the network devices 306*a* and 306*b*, for interconnecting the client 302 and the LAN 310. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and servers. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. The WAN 304 can also be a private network, such as a global enterprise network, that operates using similar or the same technologies as the public Internet.

LANs can connect nodes over dedicated private communications links located in the same general physical location, such as a building or campus. In the example of FIG. 3, the LAN 310 can be a data center that includes a single web application. A typical data center can include hundreds or thousands of simpler or more complex applications. The web application includes a web server 312 connected to a network device 314 (e.g., a hub, switch, router, etc.) for communicating with an authentication server 316, a content server 318, and a data server 320. The data server 320 can directly or indirectly connect to a database 322. Although FIG. 3 may appear to show that the web server 312, the authentication server 316, the content server 318, and the data server 320 are separate elements, the servers or various combinations of the servers can reside on a single physical machine as virtual machines, containers, or other virtual entities. Similarly, the network device 314 can be one or more physical network devices, virtual network devices, or various combinations of physical and virtual network devices in a variety of configurations (e.g., leaf-spine, three-tier (i.e., including core, aggregation, and access levels), fat tree, mesh, bus, hub and spoke, etc.).

In the example of FIG. 3, the web application can be a website associated with one or more user accounts. Users may login to their accounts and access their personal information and other content. A user may access her account associated with the website/web application from the client device 302 (e.g., via a standalone client application, web browser, plug-in, etc.). The client device 302 may communicate with the website/web application located in the LAN 310 over the WAN 304 (e.g., the Internet, an enterprise network, etc.) for the user to interact with her account in any number of ways, such as updating privileged information (e.g., name, email address, login password, etc.), viewing content, creating content, etc. Each interaction can generate one or more request flows to the website/web application. In turn, the website/web application can respond to the request flows by generating one or more response flows. However, each request may comprise one or more additional sub-requests and sub-responses. Likewise, each response can include one or more sub-requests and sub-responses. The number of sub-requests and sub-responses can largely depend on the complexity of the application. But even a simple web application/website such as illustrated in FIG. 3 can include numerous sub-requests and sub-responses.

Figure 4:
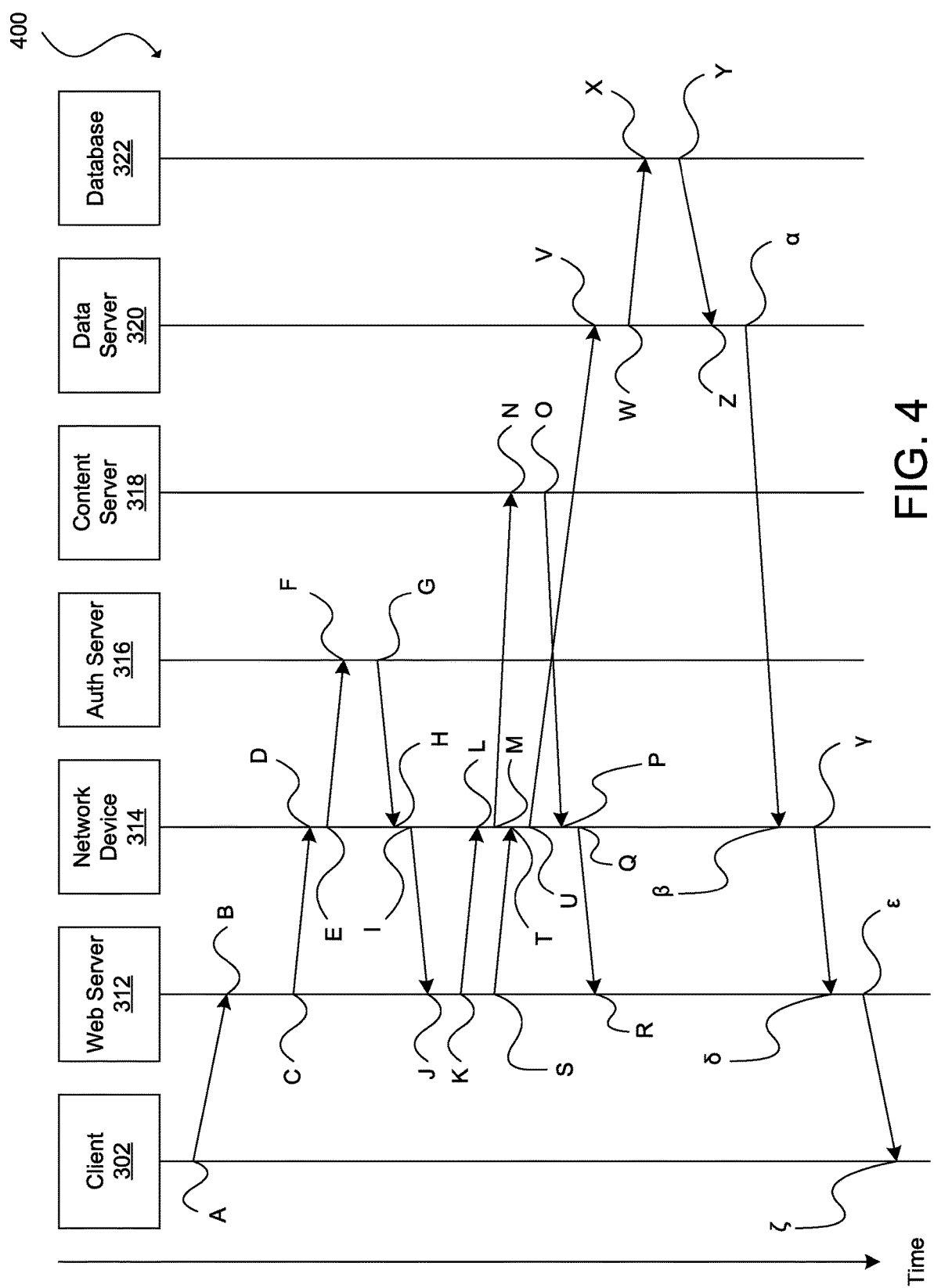
FIG. 4 illustrates an example of a network environment in accordance with an embodiment.

FIG. 4 illustrates an example of a time sequence 400 of a request and response for an interaction with the website/web application of FIG. 4. One of ordinary skill will understood that, for any sequence discussed herein, there can be additional, fewer, or alternative steps performed in similar or alternative orders, or in parallel, within the scope of the various embodiments unless otherwise stated. The user interaction may be a user logging into the website/web application, clicking to view certain content, searching for content in the website/web application, among any number of possibilities. In the time sequence 400, the vertical axis corresponds to time and the horizontal axis shows the communications between the various components of the website/web application.

In the example of FIG. 4, the client 302 may send an originating request (i.e., at point A) for a particular page of the website/web application or other content. After traversing the WAN 304, the originating request may arrive at the web server 312 after a duration AB. As discussed above, the originating request A may segments through the WAN 304, one or more of the data center's edge network devices, firewalls, load balancers, among other software and hardware components but FIG. 4 excludes those segments for brevity and clarity. The web server 312 may spend some time BC processing the request to determine that the request is a request for personal content requiring authentication. Thus, the web server 312 may send an authentication request (i.e., at point C) to the authentication server 316 to verify the user's login name and password match the user's information stored by the website/web application. To send the authentication request, the web server 312 may first forward the authentication request to the network device 314 for a duration CD. The network device 314 can receive the authentication request, take some amount of time DE to process the packets of the authentication request and forward the request to the authentication server 316 for a duration EF. The authentication server 316 may process the authentication request and prepare an authentication response (i.e., at point G) for a time FG and forward the authentication request to the network device 314 for a time GH. The network device 314 can spend a time HI to determine where to forward the authentication request GF to the web server 312 upon which the network device 314 may forward the response to the web server 312 over a duration IJ.

The web server 312 may confirm authentication of the user from the authentication response and begin retrieving content to provide a response to the originating request. The response may be a page of the website/web application that includes content from the content server 318 and personal information from the data server 320. The web server 312 may take up a time JK to prepare a content request to the content server 318 and a time KS to prepare a data request to the data server 320. The web server 312 may send the content request (i.e., at point K) to the network device 314 over a time KL, upon which the network device 314 may spend a time LM to forward the request to the content server 318 for a duration MN. The content server 318 can receive the content request K, take a time NO to process the request, and transmit a content response (i.e., at point O) to the network device 314 over a time OP. The network device 314 can process the content response for a time PQ and forward the content response to the web server after which a time QR elapses.

In parallel or very near in time to the request/response to the content server 318, the web server 312 may send the data request (i.e., at point S) to the network device 314 for a time ST. The network device can process the data request for a time TU and forward the data request over a period of time UV. The data server 320 may have an architecture in which it must retrieve requested data from the database 322, and therefore must perform some time VW processing the data request S and preparing a database request. The database request may take a time WX to arrive at the database 322. Fetching the requested data may occur over a duration XY and transmitting a database response (i.e., at point Y) back to the data server 320 may occur over a time YZ. The data server may process the database response within a time Zα before sending a data response (i.e., at point α) back to the network device 314 over a time αβ. The network device may process the data response for a time βγ and forward the data response over a time γδ. The web server 312 may assemble the content retrieved from the content server 318 and the data retrieved from the data server 320 over a time δε before sending the response (i.e., at point ε) to the originating request to the client 302 over a time εζ.

In the example of FIG. 4, the segments beginning from BC through εζ can represent the total latency for sending the response ε to the originating request A. The total response latency can thus include latency due to the web server 312, latency due to the authentication server 316, and the maximum between the latency due to the content server 318 and the latency due to the data server 320 (assuming parallel or substantially parallel requests to the content server 318 and the data server 320). Some conventional data centers may be able to derive some of these latencies. For example, a data center relying on telemetry from network devices may be able to calculate the web server latency via the timestamps of the authentication request flowlet and the authentication response flowlet. Likewise, it may be possible for data centers that rely on telemetry from servers to compute the web server latency from web server logs indicating when the web server 312 sent the authentication request flowlet to the authentication server 316 and when the web server received the authentication response flowlet from the authentication server. Various embodiments can improve upon these conventional approaches by computing more granular latencies. For example, the application and network analytics platform 100 can resolve the total latency for providing the response to the authentication request C to include the segment CD representing network latency from the web server 312 to the network device 314, the segment DE representing network device latency (although negligible and ignored in some embodiments), the segment EF representing network latency from the network device 314 to the authentication server 316, the segment FG represent authentication server latency, the segment GH representing network latency from the authentication server 316 to the network device 314, the segment HI representing network device latency, and the segment IJ representing the network latency from the network device 314 to the web server 312. The conventional data centers could not determine latency at this level of granularity but various embodiments of the present technology can by obtaining telemetry from the web server 312, the network device 314, and the authentication server 316.

Over a period of time, an application and analytics framework in accordance with some embodiments may establish baseline metrics for the network latency between the web server 312 and the authentication server 316 (i.e., segments CD, (sometimes DE), EF), authentication server latency (i.e., segment FG), and the network latency between the authentication server 316 and the web server 312 (i.e., segments GH, (sometimes HI), and IJ). When users experience latency, an administrator may determine quickly whether the issue is due to server latency or network latency based on this manner of decomposing flows into flowlets.

As shown in FIG. 4, a single user interaction with a simple application can comprise more than a dozen requests and responses. A typical enterprise network can include hundreds or thousands of much more complex applications with hundreds or thousands of users possibly performing millions or billions of operations per day. It would not be possible for a human user to process and analyze this volume of data. FIG. 4 also demonstrates the incompleteness of data centers that only rely on telemetry from one of servers or network devices. For example, in a first data center in which telemetry is only available from network devices and in a situation where the network devices' attempt to communicate with a data server is unusually slow or fails altogether, the first data center could not diagnose whether the issue arises due to application unavailability or load. In addition, the first data center may not be able to provide insight as to whether the problem lays in the data server, the database, or the connection between the data server and the database. For instance, in a data request from the web server to the data server, it may be possible for the first data center to recover a flowlet (e.g., segments ST, TU, and UV) from one or more network devices between the web server and the data server but it is not possible for the first data center to recover web server latency (e.g., segments JS or KS), data server latency (e.g., segment VW), a request flowlet from the data server to a database (e.g., segment WX), database latency (e.g., segment XY), and a response flowlet from the database (e.g., segment YZ) because the first data center may not be aware that the data server has a dependency on the database.

A second data center that relies only on telemetry from servers may also suffer from various defects. Such a system may be able to detect anomalous (or no) response times in communications between a web server and a data server but may not be able to ascertain whether latency or failure is due to the web server, network devices between the web server and the data server, the data server, a database connected to the data server, or a connection between the data server and the database. For example, in a data request from the web server to the data server, the second data center may have a view of the data request (e.g., sent at point S) and a data response (e.g., received at point δ) but network latencies (e.g., segments ST, UV, αβ, and γδ), network device latencies (e.g., segments TU and βγ), and database latencies (e.g., segments WX, XY, and YZ) (if there is no sensor on the database) may be a black box.

Returning to FIG. 1, the processing pipeline 122 can store the telemetry in a data lake (not shown), a large-scale storage repository characterized by massive storage for various types of data, enormous processing power, and the ability to handle nearly limitless concurrent tasks or jobs. In some embodiments, the analytics engine 120 may deploy at least a portion of the data lake using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. A feature of HDFS™ is its optimization for batch processing, such as by coordinating data computation to where data is located. Another feature of HDFS™ is its utilization of a single namespace for an entire cluster to allow for data coherency in a write-once, read-many access model. A typical HDFS™ implementation separates files into blocks, which are typically 64 MB in size and replicated in multiple data nodes. Clients can access data directly from the data nodes.

The processing pipeline 122 can propagate the processed data to one or more engines, monitors, and other components of the analytics engine 120 (and/or the components can retrieve the data from the data lake), such as an application dependency mapping (ADM) engine 124, an inventory monitor 126, a flow monitor 128, and a predictive performance engine (PPE) 130.

The ADM engine 124 can determine dependencies of applications running in the network, i.e., how processes on different servers interact with one another to perform the functions of the application. Particular patterns of traffic may correlate with particular applications. The ADM engine 124 can evaluate telemetry processed by the processing pipeline 122 to determine the interconnectivity or dependencies of the application to generate a graph for the application (i.e., an application dependency mapping). For example, in a conventional three-tier architecture for a web application, first servers of the web tier, second servers of the application tier, and third servers of the data tier make up the web application. From flow data, the ADM engine 124 may determine that there is first traffic flowing between external servers on port 80 of the first servers corresponding to Hypertext Transfer Protocol (HTTP) requests and responses. The flow data may also indicate second traffic between first ports of the first servers and second ports of the second servers corresponding to application server requests and responses and third traffic flowing between third ports of the second servers and fourth ports of the third servers corresponding to database requests and responses. The ADM engine 124 may define an application dependency map or graph for this application as a three-tier application including a first endpoint group (EPG) (i.e., groupings of application tiers or clusters, applications, and/or application components for implementing forwarding and policy logic) comprising the first servers, a second EPG comprising the second servers, and a third EPG comprising the third servers.

The inventory monitor 126 can continuously track the data center's assets (e.g., servers, network devices, applications, etc.) based on the telemetry processed by the processing pipeline 122. In some embodiments, the inventory monitor 126 can assess the state of the network at a specified interval or schedule (e.g., every 1 minute). That is, the inventory monitor 126 can periodically take snapshots of the states of applications, servers, network devices, and/or other elements of the network. In other embodiments, the inventory monitor 126 can capture the snapshots when events of interest occur, such as an application experiencing latency that exceeds an application latency threshold; the network experiencing latency that exceeds a network latency threshold; failure of server, network device, or other network element; and similar circumstances. Snapshots can include a variety of telemetry associated with network elements. For example, a snapshot of a server can represent the processes executing on the server at a time of capture, the amount of CPU utilized by each process (e.g., as an amount of time and/or a relative percentage), the amount of virtual memory utilized by each process (e.g., in bytes and/or as a relative percentage), the amount of physical memory utilized by each process (e.g., in bytes and/or as a relative percentage), a distance (physical and/or logical, relative and/or absolute) from one or more other network elements.

In some embodiments, on a change to the network (e.g., a server updating its operating system or running a new process; a server communicating on a new port; a VM, container, or other virtualized entity migrating to a different host and/or subnet, VLAN, VxLAN, or other network segment; etc.), the inventory monitor 126 can alert the PPE 130 to ensure that applications and the network remain performing as expected in view of the change(s) to the data center.

The flow monitor 128 can analyze flows to detect whether they are associated with anomalous or malicious traffic. In some embodiments, the flow monitor 128 may receive examples of past flows determined to perform at expectation (i.e., the length of time for the flow to reach a network device or a destination is within a threshold length of time) or perform below expectation (i.e., the length of time for the flow to reach the network device and/or destination exceeds the threshold length of time). The flow monitor 128 can utilize machine learning to analyze the telemetry processed by the processing pipeline 122 and classify each current flow based on similarity to past flows. On detection of an anomalous flow, such as a flow taking a shorter or longer duration from source to destination than a specified time range, a flow of a size less or more than a specified amount, and/or a flow previously classified as a network attack, the flow monitor 128 may transmit an alert to the PPE 130. In some embodiments, the network may operate within a trusted environment for a period of time so that the analytics engine 120 can establish a baseline of normal operation.

The PPE 130 can evaluate telemetry to make various predictions regarding application and network performance. In some embodiments, the PPE 130 can predict how adding, removing, or moving one or more network elements (i.e., servers, network devices, applications, application components, computing resources, etc.) within the data center may affect application and network performance. This can include simulating the effects of migrating an application onto a server already hosting other applications, changing the physical and/or logical characteristics of a network element (e.g., operating system, platform, CPU, memory, etc.), and running applications at certain parts of a day, week, month, or other specified interval or schedule, among other application and network performance simulations.

Figure 5:
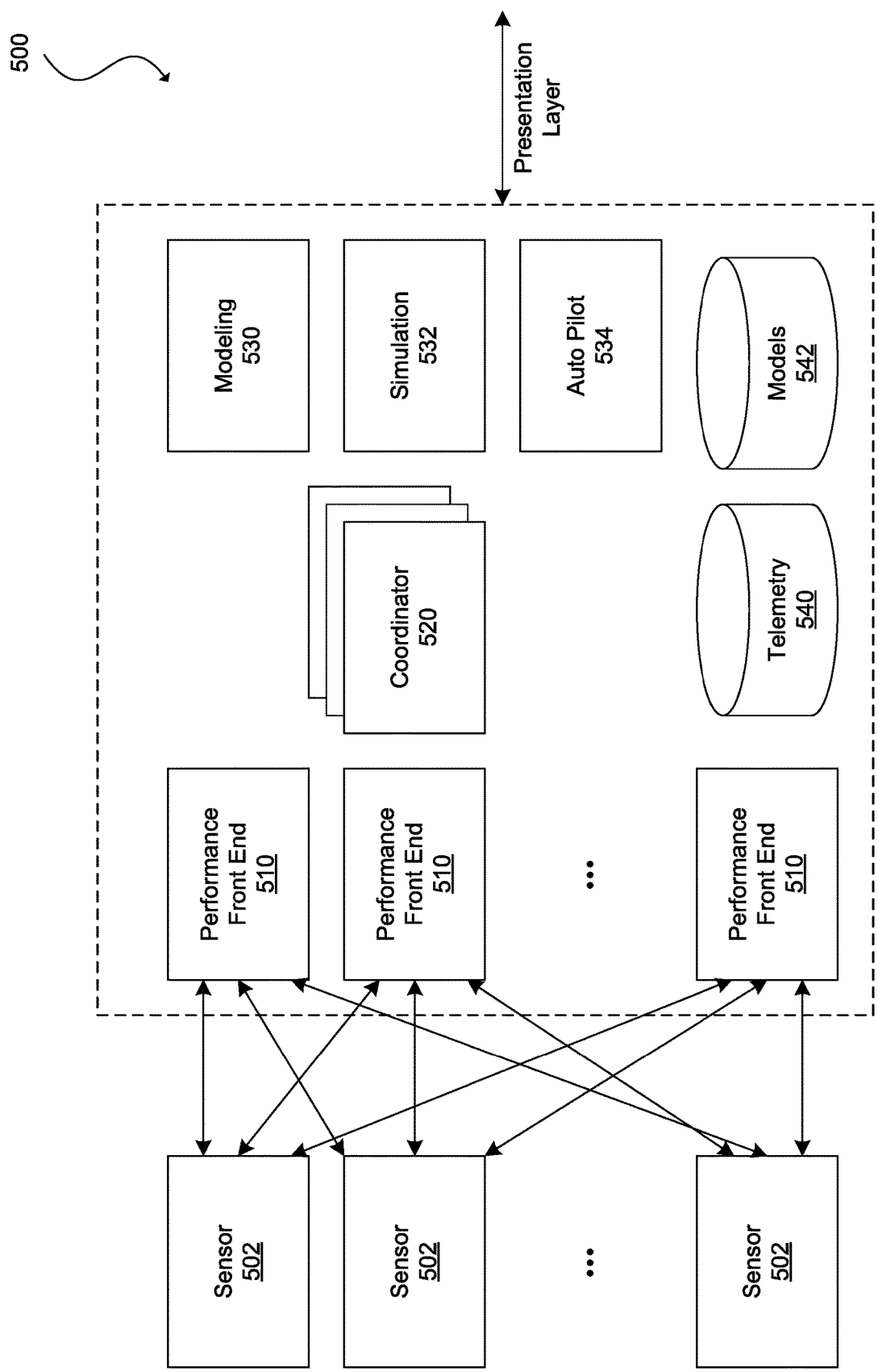
FIG. 5 illustrates an example of a predictive performance engine in accordance with an embodiment.

FIG. 5 illustrates an example of a predictive performance engine (PPE) 500 that represents one of many possible implementations of the PPE 130. The PPE 500 can include one or more performance front end processes (PFEs) 510, a coordinator cluster 520, a modeling module 530, a simulation module 532, an auto pilot module 534, a telemetry store 540, and a model store 542. While the PPE 500 includes specific components in this example, one of ordinary skill in the art will understand that the configuration of the PPE 500 is one possible configuration and that other configurations with more or less components are also possible.

FIG. 5 shows the PFEs 510 in communication with sensors 502. The sensors 502 represent one of many possible implementations of the software sensors 112 and/or hardware sensors 114 of FIG. 1. After installation on a server and/or network device of the data center, each sensor 502 can register with the coordinator cluster 520 via communication with one or more of the PFEs 510. Upon successful registration, the sensor 502 may begin capturing telemetry, including flow data, host data, process data, user data, policy data, etc. The sensors 502 may receive new configuration information from time to time, such as to capture additional telemetry for diagnostic purposes or for software upgrades. In some embodiments, the PPE 500 may encode the configuration information in a high-level, platform-independent format. In some embodiments, the sensors 502 can determine their servers' operating environments, convert the high-level configuration information into platform-specific configuration information, and apply certain platform-specific optimizations based on the operating environments. In other embodiments, the PPE 500 may translate the high-level configuration information to the platform-specific format remotely from the sensors 502 before distribution.

In some embodiments, the PFEs 510 can be responsible for storing platform-independent configuration information in memory, handling registration of the sensors 502, monitoring updates to the configuration information, distributing the updates to the sensors 502, and collecting telemetry captured by the sensors 502. In the example of FIG. 5, the PFEs 510 can function as intermediaries between the sensors 502 and the coordinator cluster 520. This can add a layer of security between servers and the PPE 500. For example, the sensors 502 can operate under the least-privileged principle having trust in only the coordinator cluster 520 and no trust in the PFEs 510. The sensors 502 and the PFEs 510 must sign and authenticate all transactions between them, including configuration and registration.

The coordinator cluster 520 can operate as the controller for the PPE 500. In the example of FIG. 5, the coordinator cluster 520 implements a high availability scheme (e.g., ZooKeeper, doozerd, and etcd) in which the cluster elects one coordinator instance master and the remaining coordinator instances serve as standby instances. The coordinator cluster 520 can manage the assignment of the sensors 502 to the PFEs 510. In some embodiments, each sensor 502 may initially register with the PFE 510 closest (e.g., physically and/or logically) to the sensor's host but the coordinator cluster 520 may reassign the sensor to a different PFE, such as for load balancing and/or in the event of the failure of one or more of the PFEs 510. In some embodiments, the coordinator cluster 520 may use sharding for load balancing and providing high availability for the PFEs 510.

In some embodiments, the coordinator cluster 520 may also be responsible for load balancing the PFEs 510, ensuring high availability of the PFEs 510 to the sensors 502, and receiving and storing the telemetry in the telemetry store 540. In other embodiments, the PPE 500 can integrate the functionality of a PFE and a coordinator or further divide the functionality of the PFE and the coordinator into additional components.

The modeling module 530 can build and update data models for representing various elements of the data center. For example, in FIG. 3 and FIG. 4, the PPE 500 can model latency of providing a client response (i.e., server/application/application latency (e.g., the segments BC, JK, JS or KS, Rδ, and δε for the web server 312, the segment FG for the authentication server 316, the segment NO for the content server 318, the segments VW and Zα for the data server 320, and the segment XY for the database 322) and network latency (e.g., the segments AB, CD, DE, EF, GH, HI, IJ, KL, LM, MN, OP, PQ, QR, WX, YZ, αβ, βγ, γδ, and εζ) as a function of the application's resource utilization and/or resource requirements (e.g., CPU, memory, storage, network, etc.), its host's total computing resources, and the relative distance among the servers and network devices making up the application:

$$L=F(Q,R,D),$$

where L can represent the total latency of providing the client response, Q can represent the application or application component's resource requirements and/or actual utilization of its host's resources (e.g., CPU, memory, storage, etc.), R can represent its host's total computing resources, and D can represent one or more distances between its host and other elements of the data center. In some embodiments, the modeling module 530 may represent Q and R as features vector including one or more features such as CPU utilization as a percentage, physical memory in utilization in bytes, total amount of physical memory in bytes, memory utilization in bytes, total amount of memory, disk utilization in bytes, total amount of disk, and so forth. In some embodiments, the features for Q and R can also include other server metadata, such as operating system, virtualization platform, public cloud provider, and other configuration information.

The distance(s) D can be physical and/or logical (e.g., number of hops) distances. In some embodiments, the application and network analytics platform 100 can determine the distance(s) D from a network topology of the data center. For example, the PPE 500 can acquire the network topology and/or the distance(s) D from customer/third party data sources (e.g., the customer/third party data sources 116 of FIG. 1), including from customer configuration data indicating the room, row, rack, cage door position, etc. of the server; a CMDB/CMS; geocoordinates; etc. In other embodiments, the PPE 500 can approximate the distance(s) D and/or the network topology as relative distances from baselines derived from telemetry. For example, from FIG. 4, the PPE 500 may determine that the baseline network latency between the web server 312 and the authentication server (e.g., the segments CD, DE, and EF) is a time t, and the baseline network latency between the web server 312 and the content server 318 (e.g., the segments KL, LM, and MN) is a time $2t$. Accordingly, the PPE 500 may approximate the distance between the web server 312 and the authentication server 316 as d and the distance between the web server 312 and the content server 318 as $2d$.

Each time the sensors 502 capture a snapshot of the state of the data center is a data point for a model of a server with a particular profile (i.e., a server with particular processing power, memory, storage, etc.). Over time, the modeling module 530 will have ample data points for assessing, within determined confidence levels, the relationships between and among server resources (e.g., CPU, memory, storage, networking, etc.), server location, latency, etc. For example, some models can express how changes to the computing resources (e.g., total amounts or actual utilization amounts) of a server can affect network latency, some models can relate how relative or absolute distances can affect server/application latency, some models can express the relationship between latency and a particular operating system, and so forth. The modeling module 530 can store these models in the models store 542. In some embodiments, the modeling module 530 may also store aggregate models or models of models, such as a model of the entire data center, a model of an application, a model of a cluster associated with an application component, or models of other granularities. In other embodiments, the modeling module 530 can build aggregate models upon a client request, such as via the presentation layer 140.

The simulation module 532 can retrieve a model or assemble a model of models, adapt the model for a specified scenario, and run the adapted model to predict application and network performance under the specified scenario. For example, in some embodiments, the simulation module 532 can retrieve a model of the data center in its current configuration. The simulation module 532 can adapt the model, such as by adding a new element (e.g., server, network device, application, application component, etc.), removing an existing element, moving the existing element from one location to another location, modifying an existing element (e.g., changing server resources, adding an application to a server, removing an application from the server, etc.), and the like. The simulation module 532 can run the updated model to determine whether the update increases latency or decreases latency in one or more segments of the network or has no effect with respect to latency in the network.

The auto pilot module 534 can automate certain application and network monitoring and management tasks within the data center. For example, in an embodiment, the auto pilot module 534 can periodically determine the optimal configuration for the data center with respect to latency by solving a constraint satisfaction problem (CSP) for minimizing latency given the current data center configuration. A CSP is a problem whose solution satisfies a set of given constraints. Formally, a CSP is a triple <V, D, C>, where V is the set of variables involved in the problem, D is a set of functions associating each variable with its domain (i.e., the set of the respective domains of values), and C is the set of constraints. In this example, the auto pilot module 534 can formulate the problem of determining the optimal configuration for the data center as follows:

Let $A=\{A_1, A_2, A_3, \ldots, A_n\}$ represent a set of applications/application components in the data center, $P=\{P_1, P_2, P_3, \ldots, P_m\}$ represent the set of physical servers in the data center, where m<n. Further let $ADM=(A, E)$ represent an application dependency map where ADM is the set of applications/application components and E is the set of edges E between applications/application components when there is a dependency between a pair $(A_i, A_j)$ of applications/application components. In addition, let $T(A_i, A_j)$ represent a function of traffic/network latency for each edge $E_i$; $Q(A_i)$ represent a feature vector of resource requirements (e.g., CPU, memory, storage, etc.) Q for an application/application component $A_i$; $R(P_i)$ represent a feature vector of resources R of a physical server $P_i$. Let the cost C of migrating applications/application components $A_i$, $A_j$ to physical servers be $P_k$, $P_l = D(A_i, A_j) \times T(A_i, A_j)$, where D is the distance (e.g., latency, delay, and/or number of hops between physical servers). In addition, let $M(A_i, P_k)$ be a function of whether to migrate an application $A_i$ to physical server $P_k$, where M is 1 if migrating an application/application component $A_i$ to physical server $P_k$, and 0 otherwise. From these definitions, the optimization problem involves solving for:

$$\min \Sigma C(A_i, P_k, A_j, P_l) \times M_{ij}^{jl}, \text{ where } M_{ik}^{jl} = M_{ik} \ast M_{jl}$$

The constraints to the optimization formula can include $\Sigma_i^A Q(i) \times M(A_i P_k) \leq R(k), \forall k$, $P_k$ to ensure that the total load on a physical server is not greater than its capacity. In some embodiments, the auto pilot module 534 can periodically determine the optimal configuration for the data center by solving the above constraint satisfaction problem and automatically migrating applications/virtual entities in accordance with the optimized configuration. In other embodiments, the PPE 500 may recommend the optimized configuration via the presentation layer 140.

The telemetry store 540 can maintain telemetry captured by the sensors 502. The model store 542 can maintain the models generated by the modeling module 530. In some embodiments, the PPE 500 can maintain recently captured and/or accessed telemetry and models in more readily-accessible data stores (e.g., solid state devices (SSD), optimized hard disk drives (HDD), etc.) and migrate older and/or unaccessed telemetry and models to less accessible data stores (e.g., commodity HDDs, tape, etc.). In some embodiments, the PPE 500 may implement the telemetry store 540 and/or the model store 542 using Druid® or other relational database platform. In other embodiments, the PPE 500 may implement the telemetry store 540 using software provided by MongoDB®, Inc. of New York, N.Y. or other NoSQL database.

Returning to FIG. 1, the presentation layer 140 can include a web graphical user interface (GUI) 142, API endpoints 144, and an event-based notification system 146. In some embodiments, the application and network analytics platform 100 may implement the web GUI 142 using Ruby on Rails™ as the web application framework. Ruby on Rails™ is model-view-controller (MVC) framework that provides default structures for a database, a web service, and web pages. Ruby on Rails™ relies on web standards such as JSON or XML for data transfer, and hypertext markup language (HTML), cascading style sheets, (CSS), and JavaScript® for display and user interfacing.

In some embodiments, the application and network analytics platform 100 can expose application programming interface (API) endpoints (e.g., such as those based on the simple object access protocol (SOAP), a service oriented architecture (SOA), a representational state transfer (REST) architecture, a resource oriented architecture (ROA), etc.) for monitor the performance of applications executing in a network and the network itself. In some embodiments, the application and network analytics platform 100 may implement the API endpoints 144 using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) called HiveQL. JDBC is an application programming interface (API) for the programming language Java®, which defines how a client may access a database.

In some embodiments, the application and network analytics platform 100 may implement the event-based notification system using Hadoop® Kafka. Kafka is a distributed messaging system that supports partitioning and replication. Kafka uses the concept of topics. Topics are feeds of messages in specific categories. In some embodiments, Kafka can take raw packet captures and telemetry information as input, and output messages to a security information and event management (SIEM) platform that provides users with the capability to search, monitor, and analyze machine-generated data.

In some embodiments, each server in the network may include a software sensor 112 and each network device may include a hardware sensor 114. In other embodiments, the software sensors 112 and hardware sensors 114 can reside on a portion of the servers and network devices of the network. In some embodiments, the software sensors 112 and/or hardware sensors 114 may operate in a full-visibility mode in which the sensors collect telemetry from every packet and every flow or a limited-visibility mode in which the sensors provide only the conversation view required for application insight and policy generation.

Figure 6:
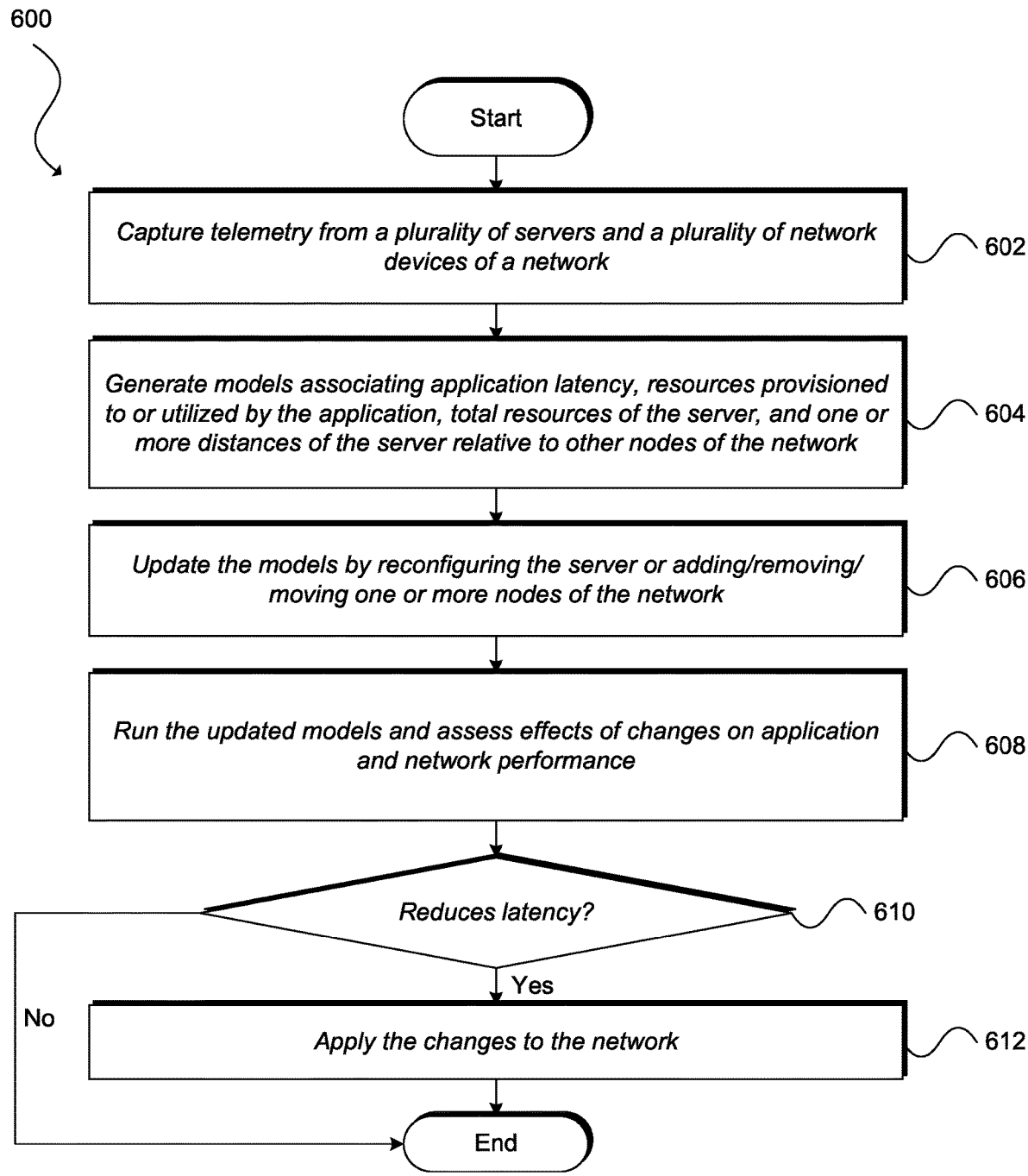
FIG. 6 illustrates an example method for predicting application and network performance in accordance with an embodiment.

FIG. 6 illustrates an example of a method 600 for predicting application and network performance from telemetry. One of ordinary skill will understood that, for any method discussed herein, there can be additional, fewer, or alternative steps performed in similar or alternative orders, or in parallel, within the scope of the various embodiments unless otherwise stated. A network, and particularly, an application and network analytics platform (e.g., the application and network analytics platform 100 of FIG. 1), an analytics engine (e.g., the analytics engine 120 of FIG. 1), a PPE (e.g., the PPE 130 of FIG. 1 or the PPE 500 of FIG. 5), a network operating system, a virtual entity manager, or similar system can perform the method 600.

In the example of FIG. 6, the method 600 may begin at step 602 in which sensors (e.g., the software sensors 112 and hardware sensors 114 of FIG. 1) capture telemetry for servers and network devices of the network (e.g., flow data, host data, process data, user data, policy data, etc.) over a first period of time to establish a baseline for application and network performance. In some embodiments, the application and network analytics platform may also collect virtualization information, network topology information, and application information (e.g., configuration information, previously generated application dependency maps, application policies, etc.). In addition, the application and network analytics platform may also collect out-of-band data (e.g., power level, temperature, and physical location) and customer/third party data (e.g., CMDB or CMS as a service, Whois, geocoordinates, etc.). As discussed, the software sensors 112 and hardware sensors 114 can collect the captured data from multiple perspectives to provide a comprehensive view of network behavior. The software sensors 112 may include sensors along multiple points of a data path (e.g., network devices, physical or bare metals servers) and within multiple partitions of a physical host (e.g., hypervisor, container orchestrator, virtual entity manager, VM, container, other virtual entity, etc.).

After collection of the telemetry, the method 600 may continue on to step 604, in which the application and network analytics platform can generate models representing applications, servers, network devices, and/or other elements of the data center. For example, one model can define total latency of providing a response to a client request (i.e., server/application/application component latencies and network latencies) as a function of the application or application component's resource requirements and/or utilization of its host's resources, its host's resources, and one or more distances (e.g., physical distance, number of hops, etc.) between its host and other elements of the data center (e.g., physical or virtual servers, network devices, etc.). However, models can associate relationships between and among any of these domains and not limited to modeling total latency for providing a response to a client request as a function of the application's resource requirements/resource utilization, its host's resources, distance, etc. Some models may associate or parameterize fewer features, such as a model of latency associated with responding to a user request as a function of distance alone (i.e., without application resource requirements/resource utilization, host resources, etc.). Some models may associate more features, such as a model of latency as a function of an application's resource requirements/resource utilization, its host's resources, distance, and its host's temperature. Some models may express different associations or parameterizations, such as a model that defines network latency as a function of CPU utilization. One of ordinary skill in the art will understand that various other combinations of associations or parameterizations are also possible in view of the telemetry captured by the application and network analytics platform.

In some embodiments, generating the models can include determining an application dependency map (ADM) (although the application and network analytics platform can also obtain an ADM via customer/third party data sources as discussed elsewhere in this disclosure). In an embodiment, the nodes of the ADM can represent a pairing or concatenation of a server and a process (or application tier, application, application component, or other application granularity in other embodiments), and the edges of the ADM graph can represent the application and network analytics framework detecting flows between nodes. Clusters of nodes (i.e., host-process pairings within a similarity threshold of one another) can represent application components and each connected graph of the ADM can represent an application.

As discussed, the application and network analytics platform can derive the nodes of the ADM by concatenating servers (e.g., the telemetry identifies that a server is a source or a destination in packet header metadata of a packet/flow) and applications/application components (e.g., the telemetry identifies a process generating a packet/flow). The application and network analytics platform can compute the edges of the ADM by detecting one or more flows between nodes of the ADM. The application and network analytics platform can further compute feature vectors for the nodes. The feature vector for each node may include a concatenation of server features, process features, and/or other features.

The server features can include the server name, network address, operating system, CPU usage, network usage, disk space, ports, logged users, scheduled jobs, open files, and information regarding files and/or directories stored on the server. The process features can include the process name, process identifier, parent process identifier, process path, CPU utilization, memory utilization, memory address, scheduling information, nice value, flags, priority, status, start time, terminal type, CPU time taken by the process, the command string that started the process, and the process owner (e.g., user name, user identifier, user's real name, e-mail address, user's groups, terminal information, login time, expiration date of login, idle time, and information regarding files and/or directories of the user. In some embodiments, the feature vectors can also include features extracted from customer/third party data such as and customer/third party data (e.g., CMDB or CMS as a service, Whois, geocoordinates, etc.)

Telemetry used to detect flows between the nodes of the ADM may include packet header fields such as source address, source port, destination address, destination port, protocol type, class of service, etc. and/or aggregate packet data such as flow start time, flow end time, number of packets for a flow, number of bytes for a flow, the union of TCP flags for a flow, etc.

The application and network analytics platform can also determine similarity between the nodes of the ADM by comparing their feature vectors Similarity can be a measure of how much alike two nodes are relative to other nodes, or a measure of two nodes being less distant to one another than other nodes. In some embodiments, the application and network analytics platform can use as similarity/distance measures one or more of Euclidean distance, Manhattan distance, Minkowski distance, cosine similarity, Jaccard similarity, and the like. In some embodiments, the application and network analytics platform can set the similarity threshold for clusters to specify a level of granularity with respect to a view of the applications executing in the network. For example, setting the similarity threshold to a very coarse degree of similarity can result in a single cluster representing the data center as a monolithic application. On the other hand, setting the similarity threshold to a very fine degree of similarity can result in singleton clusters for each host-process pairing in the network. Setting the similarity threshold can depend largely on the number and types of applications executing in the network and the level of granularity desired for the task at hand. In most situations, the similarity threshold may lie somewhere between very coarse and very fine. As discussed, clusters can represent application components, and a connected graph can represent an application.

Generating the models can further involve resolving flows into one or more flowlets. That is, the application and network analytics platform can break a flow down into a series of sub-requests and sub-responses by tracing a flow from source to destination. A request flow can include hops over network devices from source to destination and processing of the flow by the network devices. A response flow can include hops over network devices, processing of the flow by the network devices, and sub-requests and sub-responses to intermediate endpoints (including hops over network devices and processing by these network devices) performed to generate a response to the originating request flow. For example, in FIG. 4, the application and network analytics platform may decompose the response of the web server 312 to the originating request from the client 302 as a sequence including the segments BC, CD, DE, EF, FG, GH, HI, IJ, JK, KL, LM, MN, NO, OP, PQ, QR, ST, TU, UV, WX, XY, YZ, Zα, αβ, βγ, γδ, δε, and ∈ζ. The application and network analytics platform can determine timing information for each of these segments from telemetry, and generate a model that associates application latency with the resources utilized by the application, its host's total resources, and its host's distance to other elements of the data center at or around the time these segments occurred. Over time, the application and network analytics platform may collect sufficient data points to determine the functions or models that fit the data points to within a specified level of confidence.

The method 600 may continue to step 606 in which the application and network analytics platform can update one or more of the models. In some embodiments, the application and network analytics platform can include a website (e.g., the web GUI 142) or a REST API (e.g., the API endpoints 144) for a user to specify the update. In the example of FIG. 6, the application and network analytics platform can update the models to match a current configuration of the data center. In some embodiments, the application and network analytics platform can update the models upon receiving an alert of a change to the network, such as through an inventory monitor (e.g., the inventory monitor 126 of FIG. 1). In other embodiments, the application and network analytics platform can automatically evaluate the configuration of the data center at a specified interval or schedule to determine whether application and network performance can improve by changing the current configuration.

The modeling update(s) can include adding, removing, or moving a server resource (e.g., CPU, memory, storage, etc.), a network device resource, a data center element (e.g., a physical or virtual server, a network device, etc.), a combination of data center elements (e.g., a cluster representing an application component, a sub-network representing an application, a data center zone, a geographic region, a public cloud, etc.), or a data center element at a different level of granularity. Updating the model(s) can also include changing the configuration (e.g., available ports, operating system, virtualization platform, public cloud provider, etc.) of a data center element or combination of data center elements. In some embodiments, updating the model(s) can also include modifying the execution times (e.g., a different time of day, day of week, month, etc.) of applications if the applications execute at a regular interval or schedule. In some embodiments, updating the model(s) may also include re-scheduling times applications execute, such as when the applications execute at a specified interval.

At step 608, the application and network analytics platform can run the updated model(s) against telemetry to evaluate how the changes to the model(s) affect application and network performance. In some embodiments, the application and network analytics platform may generate data points for the updated model(s) using historical ground truth telemetry (i.e., actual telemetry captured by sensors over a specified time period in the past). In other embodiments, the application and network analytics platform may generate the data points from real time telemetry (i.e., telemetry currently captured by the sensors). In this manner, the application and network analytics platform may determine whether the changes break or misconfigure operation of any application or the network in a realistic simulated environment before actual implementation.

The application and network analytics platform can also determine whether the changes improve application and network performance. In some embodiments, the application and network analytics platform may determine an optimal configuration for the data center for minimizing latency. For example, the application and network analytics platform may represent the optimal data center configuration as a constraint satisfaction problem (CSP) (i.e., a triple <V, D, C>) in which the variables can include a mapping of applications/application components A={$A_1, A_2, A_3, \ldots A_n$} to physical servers P={$P_1, P_2, P_3, \ldots, P_m$}, where m<n. The domains or functions for limiting/relating the variables can include an application dependency map ADM=(A, E), where A is the set of applications/applications components and E is the set of edges between applications/application components when there is a dependency between a pair ($A_i$, $A_j$) of applications/application components. Further, each edge E is associated with traffic/network latency by a function T($A_i$, $A_j$). The domain definitions can further include a vector of resource requirements (e.g., CPU, memory, storage, etc.) Q($A_i$) for an application $A_i$, a vector of resources R($P_j$) of a physical server $P_j$; a cost C of migrating applications $A_i$, $A_j$ to physical servers $P_k$, $P_l$=D($A_i$, $A_j$)×T($A_i$, $A_j$), where D is the distance (e.g., latency, delay, and/or number of hops between the physical servers; and a function M($A_i$, $P_k$) whether to migrate an application/application component $A_i$ to physical server $P_k$, where M is 1 if migrating an application/application component $A_i$ to physical server $P_k$, and 0 otherwise, and $M_{ik}^{jl}=M_{ik}*M_{jl}$. With these variables and domain functions/definitions, the application and network analytics platform may determine the optimal configuration for the data center to minimize latency by solving for min$\Sigma C(A_i,P_k,A_jP_l)\times M_{ik}^{jl}$. The constraints can include $\Sigma_i^A Q(i)\times M(A_iP_k)\leq R(k), \forall k$, $P_k$ to limit the total resources required/utilized Q by any applications/application components $A_i$ on each physical server $P_k$ to the physical server's resources R.

At decision point 610, if the application and network analytics platform determines that a different data center configuration reduces overall latency than the current configuration, then the application and network analytics platform can facilitate implementation of the new configuration. In some embodiments, the application and network analytics platform can generate a recommendation to update the data center to the new configuration and present the recommendation via a website (e.g., the web GUI 142 of FIG. 1), API endpoints (e.g., the API endpoints 144, an event notification system (e.g., the event notification system 146). In other embodiments, the application and network analytics platform may automatically reconfigure the data center according to the new configuration determined by modeling to reduce latency of the data center. However, if the application and network analytics platform determines from modeling that no change to the data center improves application and network analytics platform may wait for a different change to the data center or wait until the next specified interval.

Figure 7A:
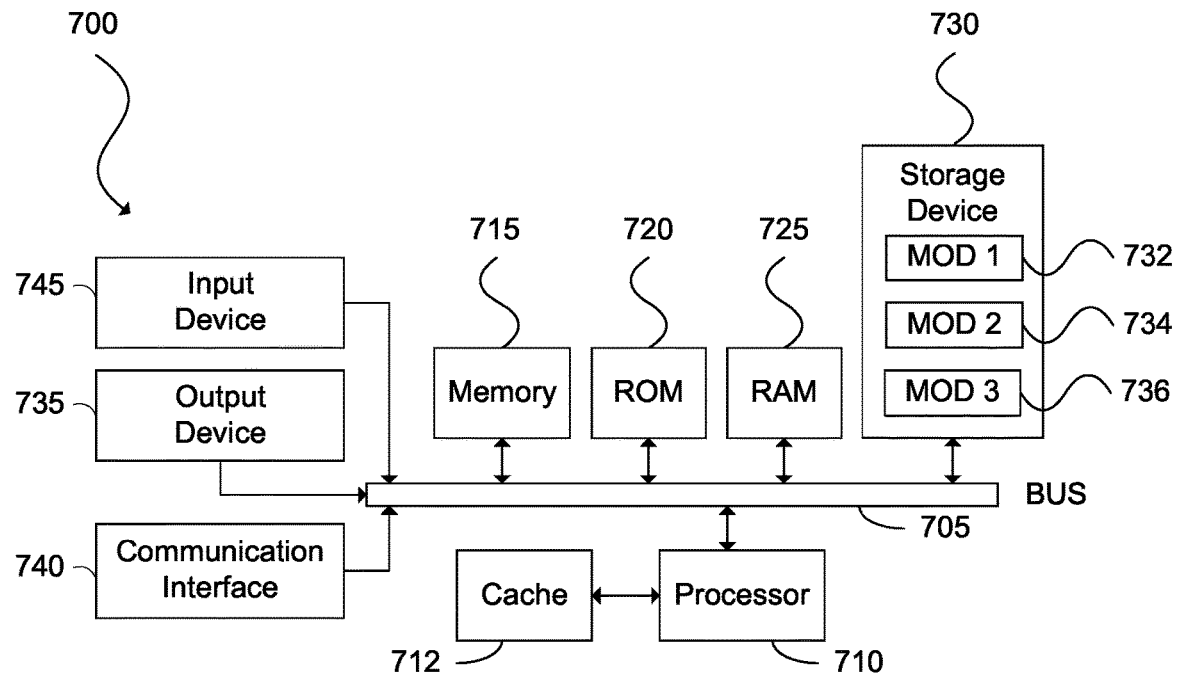
FIG. 7A and FIG. 7B illustrate examples of systems in accordance with some embodiments.
Figure 7B:
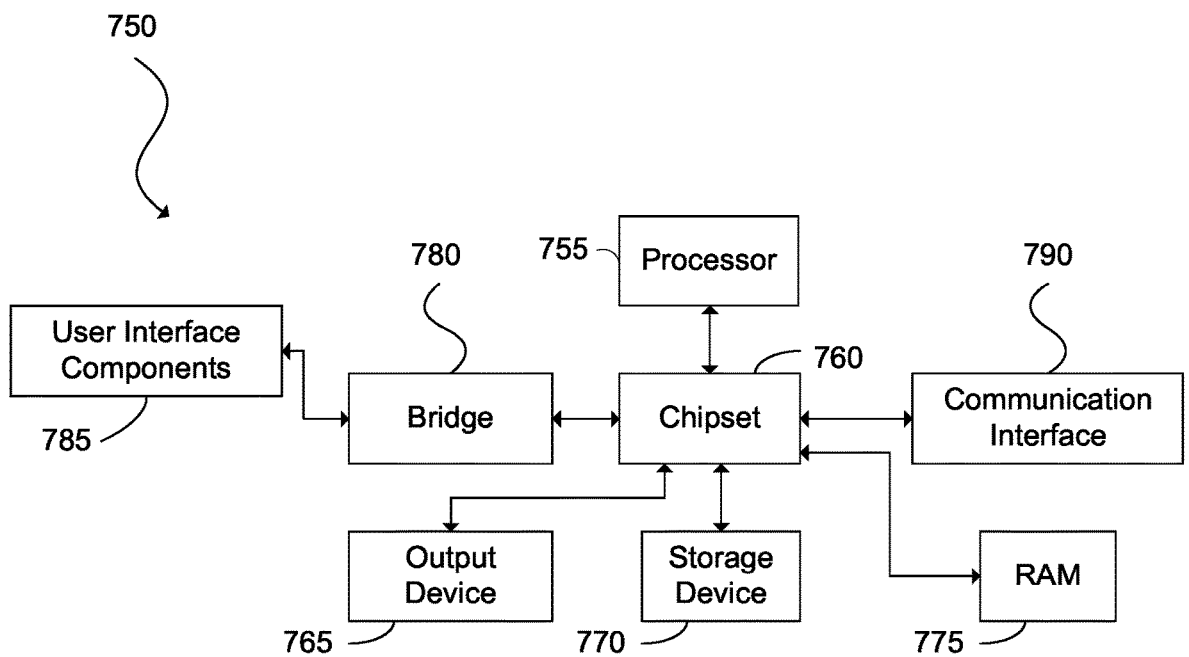

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example architecture for a conventional bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) in a storage device 770 and random access memory (RAM) 775, to the processor 710. The computing system 700 can include a cache 712 of high-speed memory connected directly with, in close proximity to, or integrated as part of the processor 710. The computing system 700 can copy data from the memory 715 and/or the storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and various other embodiments may substitute the basic features here for improved hardware or firmware arrangements.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other embodiments may utilize other hardware or software modules. The storage device 730 can connect to the system bus 705. In one aspect, a hardware module that performs a particular function can include the software component stored in a computer-readable medium in connection with the necessary hardware components, such as the processor 710, bus 705, output device 735, and so forth, to carry out the function.

FIG. 7B illustrates an example architecture for a conventional chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, and solid state media, for example. The chipset 760 can also read data from and write data to RAM 775. A bridge 780 for connecting a variety of user interface components 785 can interface with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 755 analyzing data stored in the storage device 770 or the RAM 775. Further, the computing system 700 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rack mount devices, standalone devices, and so on. Other embodiments may implement functionality described in the disclosure in peripherals or add-in cards. Other embodiments may also implement this functionality on a circuit board among different chips or different processes executing in a single device, by way of further example.

The instructions, media for conveying such instructions, computing resources for executing them, and other structures for supporting such computing resources are means for providing the functions described in these disclosures.

Although the disclosure uses a variety of examples and other information to explain aspects within the scope of the appended claims, a person having ordinary skill in art will understand not to limit the claims to particular features or arrangements in such examples, as one of ordinary skill can use these examples to derive a wide variety of implementations. Further, although the disclosure describes some subject matter in language specific to examples of structural features and/or method steps, one of ordinary skill will understand that the subject matter defined in the appended claims is not necessarily limited to these described features or acts. For example, such functionality can be distributed differently or performed in components other than those identified herein. Rather, the disclosure provides described features and steps as examples of components of systems and methods within the scope of the appended claims.

The invention claimed is:

1. A method comprising:
capturing telemetry from a plurality of servers and a plurality of network devices of a network;
analyzing the telemetry;
generating, based on the analyzed telemetry, one or more models associating a first amount of latency of an application, one or more amounts of computing resources of a server utilized to execute the application, one or more total amounts of the computing resources, and one or more distances of the server relative to one or more of the plurality of servers and the plurality of network devices;
generating one or more updated models by applying one or more changes to the one or more models; and
determining a second amount of latency of the application using the one or more updated models;
determining the one or more changes decreases a latency of the application from the first amount of latency to the second amount of latency; and
applying the one or more changes to the network in response to the determined decrease.

2. The method of claim 1, wherein determining the one or more changes occurs in response to receiving a notification of one or more corresponding changes to the network.

3. The method of claim 1, wherein determining the one or more changes occurs at a specified interval.

4. The method of claim 1, further comprising:
determining a plurality of nodes of an application dependency map for the network by concatenating server features and process features;
determining a plurality of edges of the application dependency map based on the telemetry including one or more flows between pairs of nodes of the plurality of nodes;
determining a first feature vector for a first node of the plurality of nodes; and
determining a cluster including the first node and a second node of the plurality of nodes based on a similarity metric between the first feature vector and a second feature vector of the second node satisfying a similarity threshold.

5. The method of claim 3, further comprising:
determining a plurality of flowlets for at least one flow between the first node and the second node;
determining one or more server latencies and one or more network latencies within at least one flowlet of the plurality of flowlets;
generating a data point including the one or more server latencies and the one or more network latencies; and updating at least one model of the one or more models using the data point.

6. The method of claim 1, further comprising:
determining at least one of an amount of CPU provisioned to or utilized to execute the application, an amount of storage provisioned to or utilized to execute the application, or an amount of disk provisioned to or utilized to execute the application; and
determining at least one of a total amount of CPU of the server, a total amount of storage of the server, or a total amount of disk of the server.

7. The method of claim 1, further comprising:
receiving the one or more distances from a customer data source or a third party data source.

8. The method of claim 1, further comprising:
determining the one or more distances using the telemetry.

9. The method of claim 1, wherein the one or more changes includes at least one of altering a configuration of a node of the network, adding a new node to the network, removing an existing node of the network, or migrating a node of the network from a first location to a second location.

10. The method of claim 1, further comprising:
determining that the application executes at a first schedule; and
determining a second schedule for the application that reduces an amount of latency of the application,
wherein the one or more changes includes changing a schedule of the application from the first schedule to the second schedule.

11. A system comprising:
a processor; and
memory including instructions that, upon execution by the processor, cause the system to:
capture telemetry from a plurality of servers and a plurality of network devices of a network;
analyze the telemetry;
generate, based on the analyzed telemetry, one or more models with one or more data points associating a first amount of latency of an application, one or more amounts of computing resources of a server utilized to execute the application, one or more total amounts of the computing resources, and one or more distances of the server relative to one or more of the plurality of servers and the plurality of network devices;
generate one or more updated models by applying one or more changes to the one or more models; and
determine a second amount of latency of the application using the one or more updated models;
determine the one or more changes decreases a latency of the application from the first amount of latency to the second amount of latency; and
apply the one or more changes to the network in response to the determined decrease.

12. The system of claim 11, wherein the instructions upon execution further cause the system to:
capture at least a portion of the telemetry at line rate from a hardware sensor embedded in an application-specific integrated circuit (ASIC) of at least one network device of the plurality of network devices.

13. The system of claim 11, wherein the instructions upon execution further cause the system to:
capture at least a portion of the telemetry from a software sensor residing within a bare metal server of the network.

14. The system of claim 11, wherein the instructions upon execution further cause the system to:
capture at least a portion of the telemetry from a plurality of software sensors residing within a plurality of virtual entities of a same physical server of the network.

15. A non-transitory computer-readable medium having instructions that, upon being executed by a processor, cause the processor to:
capture telemetry from a plurality of servers and a plurality of network devices of a network;
analyze the telemetry;
generating, based on the analyzed telemetry, one or more models associating a first amount of latency of an application, one or more amounts of computing resources of a server utilized to execute the application, one or more total amounts of the computing resources, and one or more distances of the server relative to one or more of the plurality of servers and the plurality of network devices;
generate one or more updated models by applying one or more changes to the one or more models; and
determine a second amount of latency of the application using the one or more updated models;
determine the one or more changes decreases a latency of the application from the first amount of latency to the second amount of latency; and
apply the one or more changes to the network in response to the determined decrease.

16. The non-transitory computer-readable medium of claim 15, wherein the instructions further cause the processor to:
determine the one or more changes reduces a latency of the application from the first amount of latency to the second amount of latency; and
apply one or more corresponding changes to the network in response to the determined reduction.

17. The non-transitory computer-readable medium of claim 15, wherein the instructions further cause the processor to:
generate data points for the one or more models from historical telemetry.

* * * * *